(12) United States Patent
Shi et al.

(10) Patent No.: US 12,446,878 B2
(45) Date of Patent: Oct. 21, 2025

(54) MULTI-PROCESSING DEVICE FOR AN ENDOSCOPE AND USE METHOD THEREOF

(71) Applicant: HANGZHOU AGS MEDTECH CO., LTD., Zhejiang (CN)

(72) Inventors: Bingchun Shi, Hangzhou (CN); Baiming Shi, Hangzhou (CN)

(73) Assignee: HANGZHOU AGS MEDTECH CO., LTD., Hangzhou (CN)

( * ) Notice: Subject to any disclaimer, the term of this patent is extended or adjusted under 35 U.S.C. 154(b) by 585 days.

(21) Appl. No.: 17/756,042

(22) PCT Filed: Nov. 10, 2020

(86) PCT No.: PCT/CN2020/127767
§ 371 (c)(1),
(2) Date: May 13, 2022

(87) PCT Pub. No.: WO2021/093723
PCT Pub. Date: May 20, 2021

(65) Prior Publication Data
US 2022/0386856 A1    Dec. 8, 2022

(30) Foreign Application Priority Data
Nov. 14, 2019   (CN) ........................... 201911111454.5
Feb. 18, 2020   (CN) .......................... 202010099167.3

(51) Int. Cl.
*A61B 17/08*    (2006.01)
*A61B 17/00*    (2006.01)
(Continued)

(52) U.S. Cl.
CPC ........ *A61B 17/083* (2013.01); *A61B 17/0684* (2013.01); *A61B 17/07207* (2013.01);
(Continued)

(58) Field of Classification Search
CPC .............. A61B 17/083; A61B 17/0684; A61B 17/07207; A61B 17/12013; A61B 17/122;
(Continued)

(56) References Cited

U.S. PATENT DOCUMENTS 8,663,247 B2 *  3/2014  Menn ................... A61B 17/122
                                              606/142
2002/0128667 A1    9/2002  Kobayashi et al.
(Continued)

FOREIGN PATENT DOCUMENTS

CN        101087564 A       12/2007
CN        102204838         10/2011
(Continued)

OTHER PUBLICATIONS

International Search Report in PCT/CN2020/127767 mailed on Feb. 9, 2021, 12 pages.
(Continued)

*Primary Examiner* — Tan-Uyen T Ho
*Assistant Examiner* — Cherie M Poland
(74) *Attorney, Agent, or Firm* — METIS IP LLC

(57) ABSTRACT

The present disclosure provides a multiple-processing device for an endoscope. The multi-processing device may comprise a plurality of processing units, a conveying component, and an operation component. The processing units may include a capsule body and clamping arms. A proximal end of the capsule body may be provided with a first limit part that may be available for deformation or failure under an external force. The distal end of a conveying pipe of the conveying component and/or the proximal end of the capsule body may be provided with a second limit part configured to expand and contract along a radial direction of the conveying pipe. The multiple-processing device not only enhances the combination between the capsule body and the (Continued)

conveying pip, so as to control the opening and closing of the clamping arms, but also prevents the processing units from interfering or jamming the inner wall of the conveying pipe due to the expanded first limit part, which can ensure the smooth movement of the processing units in the conveying pipe, so that the processing units can be effectively repeatedly opened and closed before being released. The present disclosure also provides a use method of a multi-multi-processing device for an endoscope.

20 Claims, 18 Drawing Sheets

(51) Int. Cl.
    *A61B 17/068*     (2006.01)
    *A61B 17/072*     (2006.01)
    *A61B 17/12*     (2006.01)
    *A61B 17/122*     (2006.01)
    *A61B 17/128*     (2006.01)

(52) U.S. Cl.
    CPC ...... *A61B 17/12013* (2013.01); *A61B 17/122* (2013.01); *A61B 17/1227* (2013.01); *A61B 17/128* (2013.01); *A61B 17/1285* (2013.01); *A61B 2017/0034* (2013.01); *A61B 17/068* (2013.01)

(58) Field of Classification Search
    CPC ............. A61B 17/1227; A61B 17/128; A61B 17/1285; A61B 17/068; A61B 2017/0034
    USPC .......................................................... 606/142
    See application file for complete search history.

(56) References Cited

U.S. PATENT DOCUMENTS

| | | | |
|---|---|---|---|
| 2005/0277954 A1* | 12/2005 | Smith | A61B 17/1285 606/142 |
| 2005/0288551 A1 | 12/2005 | Callister et al. | |
| 2006/0271072 A1 | 11/2006 | Hummel et al. | |
| 2013/0211432 A1 | 8/2013 | Terada | |
| 2014/0171974 A1* | 6/2014 | Zhu | A61B 17/128 606/144 |
| 2014/0249553 A1* | 9/2014 | Kimura | A61B 17/1227 606/157 |
| 2017/0238936 A1 | 8/2017 | Mujawar | |
| 2018/0344323 A1* | 12/2018 | Shi | A61B 17/122 |
| 2019/0167265 A1* | 6/2019 | Chen | A61B 17/072 |
| 2020/0163676 A1 | 5/2020 | Menn et al. | |

FOREIGN PATENT DOCUMENTS

| | | |
|---|---|---|
| CN | 107106181 A | 8/2017 |
| CN | 108420494 A | 8/2018 |
| CN | 108784773 | 11/2018 |
| CN | 109394291 | 3/2019 |
| CN | 110072477 | 7/2019 |

OTHER PUBLICATIONS

Written Opinion in PCT/CN2020/127767 mailed on Feb. 9, 2021, 13 pages.

* cited by examiner

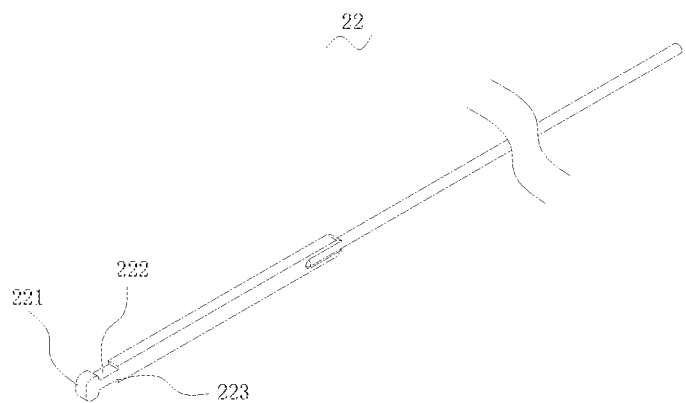
FIG.10
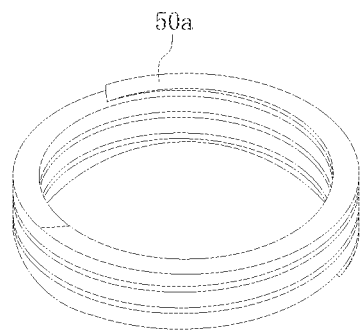
FIG.11
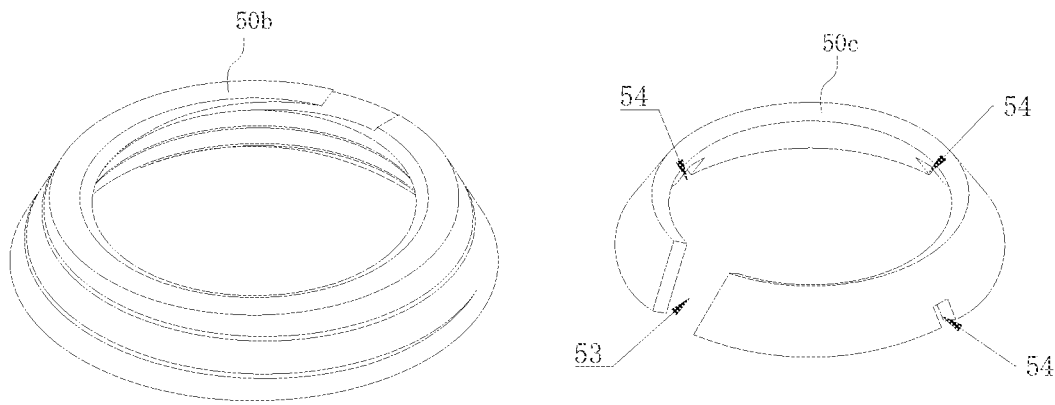
FIG.12
FIG.13

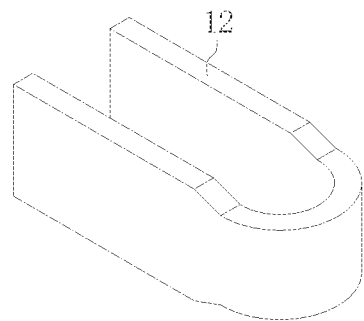
FIG.29
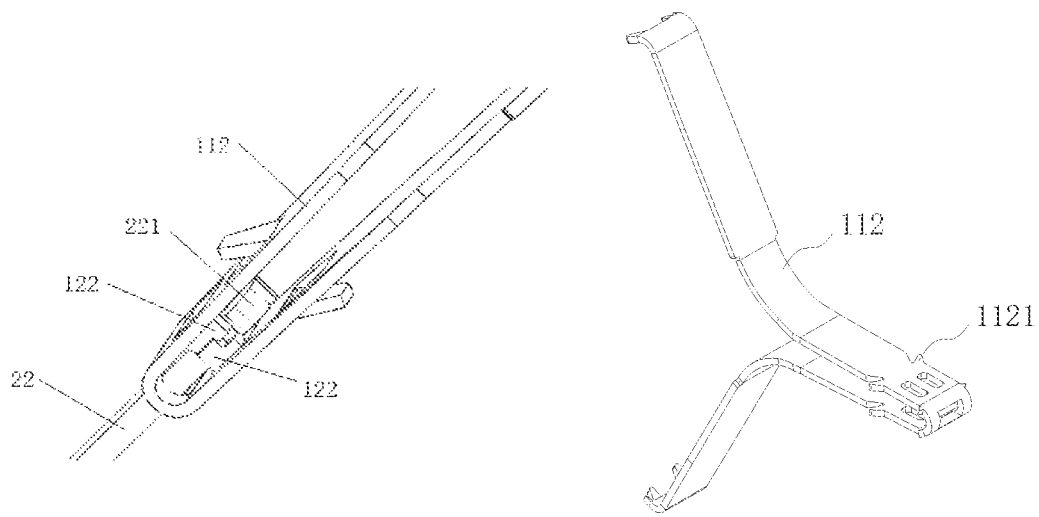
FIG.30
FIG.31
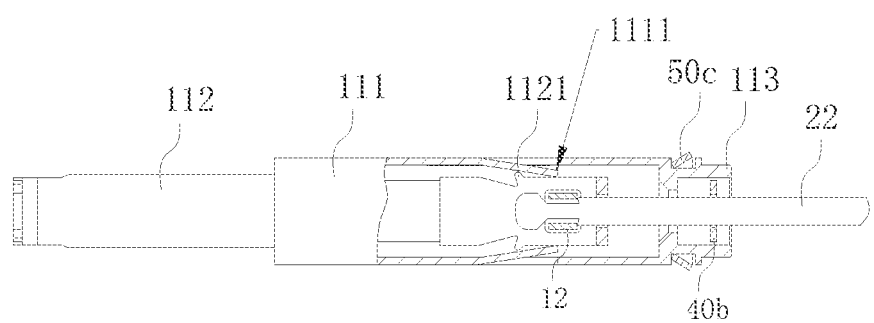
FIG.32

MULTI-PROCESSING DEVICE FOR AN ENDOSCOPE AND USE METHOD THEREOF

CROSS-REFERENCE TO RELATED APPLICATION

This application is a U.S. national stage under 35 U.S.C. § 371 of International Application No. PCT/CN2020/127767, filed on Nov. 10, 2020, which claims priority to Chinese Patent Application No. 201911111454.5, filed on Nov. 14, 2019, named "multi-processing device for endoscope and use method thereof", and Chinese Patent Application No. 202010099167.3, filed on Feb. 18, 2020, named "multi-processing device for an endoscope and use method thereof", each of which is incorporated hereby by reference.

TECHNICAL FIELD

The present disclosure generally relates to technical field of medical device, in particular, to a multi-processing device for an endoscope and use method thereof.

BACKGROUND

Endoscope has been born for more than 50 years, and has experienced a stage of disease diagnosis to disease treatment. Endoscope has been very effective and reliable for treatments of some diseases. Flexible endoscope has been widely used in the fields of digesti endoscopic diagnosis and treatment. In clinic, hemostasis can be mechanically pressed by hemostatic clamp, which can grasp the tissue around a wound and temporarily keep the wound edges together to close the wound. It is also used in wound suture. More than one hemostatic clamp is sometimes required during operation. Frequent instrument switching will reduce the operation efficiency and increase the risk of patients.

Since a diameter of endoscopic instrument channel is between 2.8 mm and 3.2 mm, and there may be bending of more than 180° in mirror surgery, how to ensure a precise combination of free rotation, transportation, front and back switching and repeated opening and closing functions of minimally invasive multi-hemostatic clip under the above extreme bending status is a problem that traditional multi-hemostatic clip needs to overcome. In the traditional multi-hemostatic clip, a plurality of clip units are arranged in a conveying pipe, and the rear clip unit may be stuck due to an interference of the front clip unit. At the same time, because multiple clip units are accommodated in the conveying pipe, they cannot smoothly pass through a curved conveying pipe cavity in the extreme bending status, and can not realize stable repeated opening and closing after the clip unit extends out of the conveying pipe.

SUMMARY

One aspect of the embodiments of the present disclosure provides a multiple-processing device for an endoscope. The multi-processing device for an endoscope may comprise: a plurality of processing units, the plurality of processing units including a capsule body and clamping arms, the clamping arms being accommodated in the capsule body and moving to form an open configuration and a closed configuration, a proximal end of the capsule body being provided with a first limit part that may be available for deformation or failure under an external force; a conveying component including a conveying pipe for accommodating the plurality of processing units and a control member passing through the conveying pipe, a distal end of the conveying pipe being provided with a baffle extending towards an axial center of the conveying pipe, the control member being configured to drive a most distal processing unit in the plurality of processing units to switch from a combination configuration to a release configuration, wherein in the combination configuration, the most distal processing unit among the processing units may be connected with the distal end of the conveying pipe, and in the release configuration, the most distal processing unit may be separated from the distal end of the conveying pipe; and an operation component including a handle part connected with a proximal end of the conveying pipe and a sliding part sleeved on the handle part, the sliding part being connected with a proximal end of the control member, and the sliding part configured to drive movement of the control member; wherein at least one of the distal end of the conveying pipe or the proximal end of the capsule body may be provided with a second limit part, the second limit part may be configured to abut against the baffle, and expand and contract along a radial direction of the conveying pipe.

In some embodiments, the second limit part may be disposed on the distal end of the conveying pipe, and in the combination configuration, the second limit part may be located at a proximal end of the baffle; and the first limit part may have a concave part recessed toward an axial center of the capsule body, and the concave part may be configured to abut against the second limit part and limit the capsule body.

In some embodiments, in the release configuration, an outer diameter of the first limit part may be smaller than the smaller of a diameter of a first through hole formed by the baffle and an inner diameter of the second limit part.

In some embodiments, the first limit part may have an extension part for accommodating the second limit part and an elastic part sleeved on the concave part, and an inner surface of the elastic part may abut against an outer surface of the concave part, and the elastic part may be configured to collapse the concave part.

In some embodiments, the first limit part may include a first base part and a first convex part, the first base part may be accommodated in the proximal end of the capsule body, the first convex part may be connected to the first base part and extend outward, and the first convex part may extend out of a sidewall of the capsule body and may be limited to a proximal side of the baffle.

In some embodiments, an included angle between surfaces of the first base part and the first convex part may be smaller than or equal to 30°, a surface of a proximal end of the first base part may be provided with a variable part, and the variable part may be configured to cause the first base part to deform or fail when the first base part is stressed.

In some embodiments, the variable part may penetrate the surface of the proximal end of the first base part.

In some embodiments, a distal end of the control member may be protruded with a head part, a second through hole may be provided at a center of the first base part, the head part passing through the first base part through the second through hole, and a minimum inner diameter of the second through hole may be smaller than a maximum outer diameter of the head part.

In some embodiments, the plurality of processing units may include a base fixed at the proximal end of the capsule body, the base may be provided with an accommodation cavity for accommodating the first base part, and a sidewall of the base may be provided with a third through hole for the first convex part to extend.

In some embodiments, in the combination configuration, the first limit part may be located in the baffle and connected with the baffle through clamping, in the release configuration, the first limit part may deform or fail under the control member and release the clamping with the baffle, a diameter of the first through hole formed by the baffle may be greater than an outer diameter of a distal end of the first limit part and smaller than an outer diameter of a proximal end of the second limit part.

In some embodiments, an inner diameter of the second limit part may decrease from the proximal end of the conveying pipe to the distal end of the conveying pipe.

In some embodiments, the second limit part may be arranged at the distal end of the conveying pipe and may be accommodated in the proximal end of the baffle, in a state of no radial force acting on the second limit part, an inner diameter of a distal end of the second limit part may be smaller than an outer diameter of the plurality of processing units and an inner diameter of a proximal end of the second limit part may be larger than the outer diameter of the plurality of processing units.

In some embodiments, in the combination configuration, a distal end of the second limit part may abut against the concave part, the proximal end of the baffle may abut against a surface of a distal end of the first limit part, and the control member may be configured to move the clamping arms to form the open configuration and the closed configuration; in the release configuration, a proximal end of the sliding part may move to release a combination relationship between the control member and the most distal processing unit and a combination relationship between the control member and the first limit part to disable a combination of the first limit part and the baffle.

In some embodiments, the second limit part may be arranged at the distal end of the conveying pipe, and the second limit part may include a plurality of tooth parts arranged at intervals along a circumferential direction of the conveying pipe, the plurality of tooth parts converging toward the distal end of the conveying pipe, surfaces of distal ends of the tooth parts may be configured to abut against the concave part, and proximal ends of the tooth parts may be configured to abut against expanded first limit part.

In some embodiments, the second limit part may include a second base part and one or more second convex parts, the second base part may be accommodated in the capsule body, each of the one or more second convex parts may be connected with the second base part and extend outward, and the one or more second convex parts may extend out of a sidewall of the capsule body and limit the baffle.

In some embodiments, a number of the one or more second convex parts may exceed 1, and the one or more second convex parts may be arranged at intervals along a circumferential direction of the second base part.

In some embodiments, a first opening providing deformation allowance may be arranged on a sidewall of the second limit part, and the first opening may penetrate the sidewall of the second limit part; and/or the sidewall of the second limit part may be provided with one or more second openings, the one or more second openings may extend from a surface of the proximal end of the sidewall of the second limit part to the sidewall of the second limit part, a number of the one or more second openings may exceed 1, and the one or more second openings may be arranged at intervals along the circumferential direction of the second limit part.

In some embodiments, the distal end of the control member may be configured as a head part, a concave part and a shoulder part; and/or a proximal end of the clamping arms may be provided with a fastener for the concave part to pass through and be fixed, the fastener may abut against the proximal end of the head part and the distal end of the shoulder part, and the fastener may disable when subjected to a predetermined force.

In some embodiments, the distal end of the shoulder part may be inclined toward a central axis to ensure that the control member is clamped at a proximal end of the fastener, to drive the most distal processing unit to rotate.

In some embodiments, the fastener may include a pair of pin sheets passing through the proximal end of the clamping arm, each of the pair of pin sheets may include a first end and a second end, the second end may be a movable end, the first end may be integrally formed into a U shape or the first end may be provided with a block strip configured to limit the pin sheet and fix the first end on the clamping arm.

In some embodiments, wherein the fastener may include folding parts formed by surfaces of the clamping arms transiting inward, and the folding parts and the clamping arms may be surrounded and form two end faces for clamping against the concave part.

In some embodiments, the plurality of processing units may include a guide structure arranged between two clamping arms; under the closed configuration, the control member may pass through the guide structure in a direction of the head part abutting against the fastener to a proximal side under restriction of the guide structure.

In some embodiments, a portion of a sidewall at the proximal end of each of the clamping arms may extend outward and form a locking part, a portion of a sidewall of the capsule body may bend inward and form a clamping hole part on the sidewall of the capsule body, the clamping hole part may be fitted with the locking part and may be configured to restrict the clamping arms from moving towards the distal end of the capsule body; and/or the baffle may be provided with a through hole for the capsule body and the second limit part to pass through, an outer diameter of a proximal end of the second limit part may be greater than a diameter of the through hole of the baffle, and the second limit part may be configured to pass through the through hole of the baffle by interference; and/or, the plurality of processing units may be arranged successively along a length of the conveying pipe, and the plurality of processing units may be available to leave an inner cavity of the conveying pipe one by one and release from the distal end of the conveying pipe one by one.

In some embodiments, the conveying pipe may include a first pipe substantially located at the distal end of the conveying pipe and a second pipe substantially located at the proximal end of the first pipe, the first pipe may be fixed at the second pipe, the first pipe may be wound by flat wires, the second pipe may be wound by round wires, and the first pipe may be configured to accommodate the plurality of processing units; and/or, the plurality of processing units may include the most distal processing unit and at least one non-distal processing unit, in the combination configuration, the control member may penetrate the at least one non-distal processing unit and penetrate a distal end of the first limit part of the most distal processing unit; the control member may be configured to move in a direction of the distal end of the conveying pipe to the proximal end of the conveying pipe to switch the most distal processing unit to the release configuration, and may be connected with a non-distal processing unit adjacent to the most distal processing unit; the operation component may be configured to drive the at least one non-distal processing unit to move along a direction from the proximal end of the conveying pipe to the distal end of the conveying pipe, so that a most distal processing unit in the at least one non-distal processing unit may arrive at the distal end of the conveying pipe.

Another aspect of the embodiments of the present disclosure provides a multi-processing device for an endoscope, the multi-processing device may comprise: a processing component, including a plurality of processing units, a proximal end of the plurality of processing units being provided with a first limit part that may be available for deformation or failure under an external force; a conveying component including a conveying pipe for accommodating the processing component, a push pipe passing through the conveying pipe, and a control member passing through the push pipe, wherein a distal end of the push pipe may abut against a processing unit close to the push pipe; an operation component, wherein the operation component may include: a handle part connected with a proximal end of the conveying pipe; a sliding part connected with a proximal end of the control member to control opening, closing, and release of a most distal processing unit; and a push component arranged on the handle part, the push component including a fixed seat fixed at a proximal end of the push pipe; wherein the handle part may be provided with a chute for sliding of the fixed seat, and the handle part may be provided with a marker matching with the fixed seat and indicating a number of the plurality of processing units along the chute.

In some embodiments, the push component may also include a locking member and a reset member, the locking member may be connected to the fixed seat, the reset member may be arranged between the fixed seat and the locking member and abut against the locking member, the locking member may be provided with a first locking part, the handle part may be provided with a second locking part, and the first locking part may be configured to engage or disengage with the second locking part to lock or unlock the locking member and the handle part.

In some embodiments, the handle part may be provided with marking parts, and a number of the marking parts may exceed 1, the marking parts may be arranged along a moving direction of the fixed seat at the same interval; the marking parts may be digital markers, the digital markers may be configured to indicate a number of remaining processing units.

In some embodiments, the fixed seat may be provided with a guide column extending towards the locking member, the locking member may be provided with a guide groove for the guide column to extend, and the locking member may be configured to move along an axis direction of the guide column relative to the locking member.

In some embodiments, the locking part may be also provided with an extension part which may extend out of a sidewall of the handle part under a locking configuration, and the sidewall of the handle part may be correspondingly provided with a chute for the extension part to extend and slide.

In some embodiments, the push component may also include crimping parts, and the crimping parts may be sleeved on the push pipe and fixedly connected with the fixed seat.

In some embodiments, a number of the crimping parts may be set to two, and the two crimping parts may be respectively fixed at both ends of the fixed seat.

Another aspect of the embodiments of the present disclosure provides a use method of a multi-processing device for an endoscope, the use method is based on a multi-processing device for an endoscope, the multi-processing device for an endoscope may include a processing component, a conveying component and a push component, the processing component may include a plurality of processing units, and the push component may include a conveying pipe for accommodating the processing component, a push pipe passing through the conveying pipe, and a control member passing through the push pipe, wherein a distal end of the push pipe may abut against a processing unit close to the push pipe; the push component may be fixedly connected to a proximal end of the push pipe; the use method may comprise: after a processing unit at a most distal end of the conveying pipe is released, driving the control member to a proximal side relative to the conveying pipe until a first user feedback indicating a connection of a next processing unit and a distal end of the control member is obtained; driving the push component to a distal side relative to the conveying pipe, and moving the next processing unit to a distal end of the conveying pipe through the push pipe fixed to the push component until a second user feedback indicating a connection of the next processing unit and the distal end of the conveying pipe is obtained; after the second user feedback is obtained, driving an operation component to cause a most distal processing unit to open and close freely to obtain a desired action posture.

In some embodiments, the push component may include a fixed seat, a locking member, and a reset member, the reset member may be arranged between the fixed seat and the locking member and may abut against the locking member, the locking member may be provided with a first locking part matched with a second locking part on a handle part; the driving the push component to a distal side relative to the conveying pipe, and moving the next processing unit to a distal end of the conveying pipe through the push pipe fixed to the push component until a second user feedback indicating a connection of the next processing unit and the distal end of the conveying pipe is obtained, may further include: driving the push component to the distal side relative to the conveying pipe, when the push pipe moves, pressing the locking member to unlock the first locking part and the second locking part; after the second user feedback is received, releasing the locking member to restore a locking of the first locking part and the second locking part.

Compared with the traditional technology, the beneficial effect of the application is that the proximal end of the capsule body may be provided with a first limit part that may deform or fail under an action of external force, the distal end of the conveying pipe may be provided with a baffle clamped with the first limit part, and under the combination configuration of the first limit part and the baffle, the clamping arms may switch between the open configuration and the closed configuration. The distal end of the conveying pipe and/or the proximal end of the capsule body may be provided with a second limit part configured to abut against the baffle. The second limit part may be correspondingly located on an inner side or the outer side of the baffle, and may make the distal end of the capsule body pass through the baffle through outward expansion or contraction. On the one hand, the clamping between the first limit part and the conveying pipe may be enhanced, and on the other hand, the movement of the capsule body relative to the proximal end of the conveying pipe may be limited. The multi-processing device for an endoscope may not only ensure the smooth movement of the processing units in the conveying pipe, and the expanded first limit part may not interfere or jam the inner wall of the conveying pipe, but also may realize the effective repeated opening and closing of the processing unit before being released through the action with the first limit part.

Since the control member may be effectively loaded with each processing unit, especially with the next processing unit, and may be opened and closed repeatedly, it may ensure that a release process of each processing unit may be stable and reliable. The multi-processing device for an endoscope at one time may release multiple processing units to clamp the lesion, which may greatly reduce an operation time and reduce the discomfort during the operation.

In addition, the application also provides a multi-processing device for an endoscope. Through the push component arranged in the handle part, it may act on the push pipe and drive the push pipe to move synchronously, so that the processing unit located at the proximal end of the conveying pipe may move to the distal end of the conveying pipe, so that the control member may effectively load and operate the processing unit located outside its loading stroke, so as to increase the number of processing units in the conveying pipe, and ensure that each processing unit may be effectively loaded.

The application also provides a use method of a multi-processing device for an endoscope.

BRIEF DESCRIPTION OF THE DRAWINGS

In order to better describe and illustrate embodiments and/or examples of the present disclosure, reference may be made to one or more drawings. Additional details or examples for describing the accompanying drawings should not be considered as limiting the scope of any of the disclosed inventions, the presently described embodiments and/or examples, and the best modes of the inventions as currently understood.

FIG. 9(*b*) is a schematic diagram of the first limit part in a stressed and deformed state in one embodiment;

FIG. 9(*c*) is a schematic diagram of the first limit part in a stressed and failure state in one embodiment;

FIG. 10 is a structural diagram of the control member in one embodiment;

FIG. 11 is a structural diagram of the second limit part in one embodiment;

FIG. 12 is a structural diagram of the second limit part in one embodiment;

FIG. 13 is a structural diagram of the second limit part in one embodiment;

FIG. 29 is a structural diagram of the fastener;

FIG. 30 is a structural diagram of an assembly structure of a fastener, a processing unit, and a control member in one embodiment;

FIG. 31 is a structural diagram of the clamping arms in one embodiment;

FIG. 32 is a structural diagram of the clamping arms in an active state in one embodiment;

Figure 1:
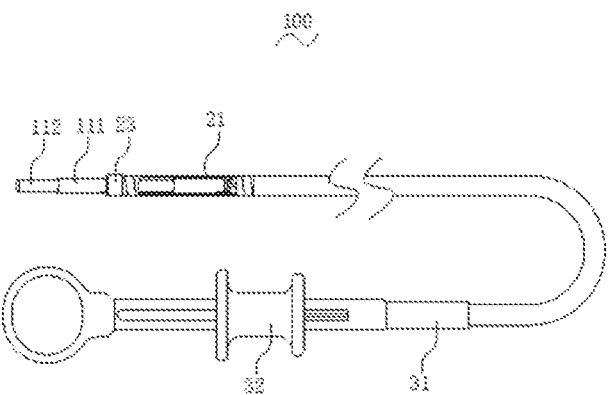
FIG. 1 is a structural schematic diagram of the multi-processing device for an endoscope in a first viewing angle in one embodiment of the present disclosure.

multi-processing device for an endoscope—100; processing component—10; processing unit—11; capsule body—111; clamping hole part—1111; opening pore—1112; clamping arm—112; locking part—1121; locking seat—1122; base—113; third through hole—1131; limit structure—114; fastener—12; pin sheet—121; block strip—1211; folding part—122; spacer member—13; conveying component—20; conveying pipe—21; first pipe—211; second pipe—212; control member—22; head part—221; concave part—222; shoulder part—223; mounting part—23; first through hole—230; seat body—231; baffle—232; tooth part—233; forth through hole—234; flange—235; push pipe—25; operation component—30; handle part—31; second locking part—311; chute—312; marking part—313; sliding part—32; connecting rod—321; sliding ring—322; thumb ring—323; first limit part—40,40a,40b; lumen—400; extending part—41a; clamping hole part—42a; clamping convex part—42a1; concave part—43a; elastic part—44a; first base part—41b; second through hole—41b0; variable part—41b1; first convex part—42b; second limit part—50,50a, 50b,50c,50d; second base part—51d; second convex part—52d; first opening—53; second opening—54; push component—60; fixed seat—61; guide column—611; locking member—62; first locking part—621; guide groove—622; extension part—623; reset member—63; crimping piece—64.

DETAILED DESCRIPTION

The technical solutions in the embodiments of the present disclosure will be clearly and completely described below with reference to the drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative work fall within the protection scope of the present disclosure.

It should be noted that when a component is considered to be "arranged at" another component, it can be set directly on another component or there may be intermediate components at the same time. When a component is considered to be "connected" to another component, it can be directly connected to another component or there may be intermediate components at the same time. When a component is considered "fixed" to another component, it can be directly fixed to another component or there may be centered components at the same time.

It should be understood that in the description of the present disclosure, the orientation or position relationship indicated by the orientation words involved is usually based on the orientation or position relationship shown in the attached drawings, which is only for the convenience of describing the application and simplifying the description. In the absence of contrary description, these orientation words do not indicate and imply that the device or element must have a specific orientation or be constructed and operated in a specific orientation. Therefore, it cannot be understood as a limitation on the scope of protection of the application. The location words "inside and outside" refer to the inside and outside of the contour relative to each component itself.

Unless otherwise defined, all technical and scientific terms used herein have the same meanings as those commonly understood by those skilled in the technical field of the application. The terms used in the specification of the application herein are only for the purpose of describing specific embodiments, and are not intended to limit the present disclosure. The term "and/or" as used herein includes any and all combinations of one or more related listed items.

It should be noted that "proximal end" and "proximal side" are used herein to refer to an end or a side closer to an operator during operation, and are in the opposite positions or directions to the terms "distal end" and "distal side"; "distal end" and "distal side" refer to an end or a side far away from the operator during operation, and are in the opposite positions or directions to the terms "proximal end" and "proximal side".

The traditional multi-processing device for an endoscope can continuously release multiple processing units in an organism, and grasp the tissue around a wound to clamp the edge of the wound and realize an effect of closing the wound. Before a processing unit is released, it is necessary to adjust the clamping of a lesion by moving and rotating the processing unit back and forth. When moving the processing unit back and forth, a distal end of the processing unit can switch between opening and closing to realize the repeated opening and closing of the processing unit. When rotating the processing unit, it can adjust the clamping angle of the processing unit and improve the accuracy of clamping operation, so as to better align the lesion s and effectively clamp the focus.

The processing units enters the organism through a 1 m-2 m flexible endoscope and is delivered to the lesion. The endoscope can bend at a large angle in the organism, which is easy to lead to a situation that the processing units of the traditional multi-processing device for an endoscope cannot bend or transmit torque to a distal processing unit.

In addition, the traditional processing device can also insert and release multiple processing units at one time to clamp multiple lesion. However, after a prior processing unit is released, the next processing unit is difficult to effectively load and repeatedly open with a control device, resulting in multiple function failure or limitation. Therefore, in order to ensure the clamping operation and stable release of each processing unit, it is very important that each processing unit can be loaded effectively.

At present, the processing unit can be opened and closed repeatedly before being released by setting a limit convex which can be elastically deformed at the proximal end of the processing unit. Specifically, a control member abuts against a limit convex and can expand the diameter of the limit convex outward radially. When the control member is separated from the limit convex, the limit convex can shrink radially. The limit convex cooperates with a distal end of a conveying pipe through elastic deformation, so that the limit convex at the proximal end of the processing unit can be constrained to the distal end of the conveying pipe when the processing unit is repeatedly opened and closed to clamp lesion. However, in the traditional multi-processing device for an endoscope, if the radial deformation of the limit convex is large, the elastically deformed limit convex will interfere with an inner wall of the conveying pipe, affect the smooth movement of the processing unit in the conveying pipe, and is not conducive to release from the conveying pipe into the organism. If the radial deformation of the limit convex is small, it is easy to separate from the distal end of the conveying pipe, which is not conducive to the repeated opening and closing operation.

Figure 2:
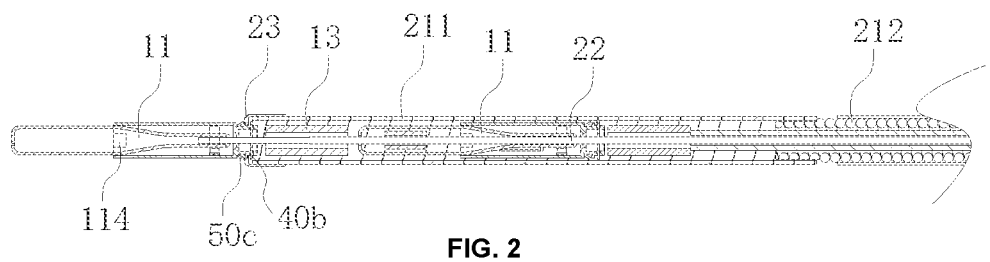
FIG. 2 is a sectional view of the multi-processing device for an endoscope shown in FIG. 1.
Figure 3:
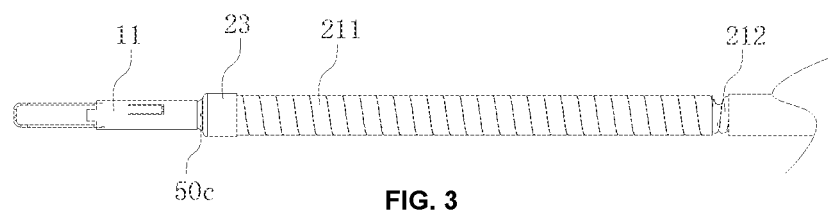
FIG. 3 is a structural schematic diagram of the multi-processing device for an endoscope in a second viewing angle shown in FIG. 1.
Figure 4:
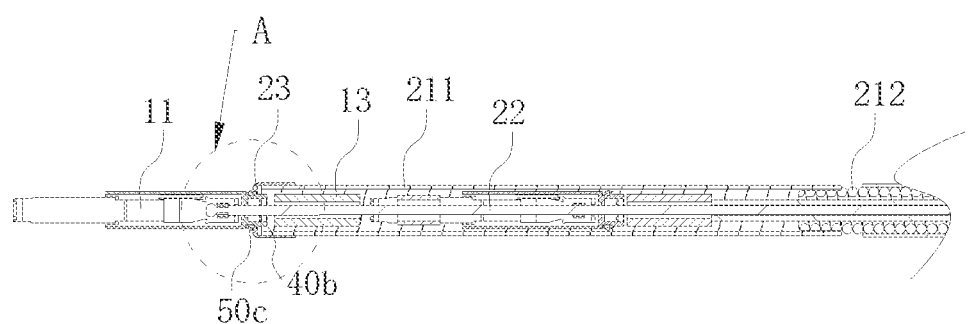
FIG. 4 is a sectional view of the multi-processing device for an endoscope shown in FIG. 3.
Figure 5:
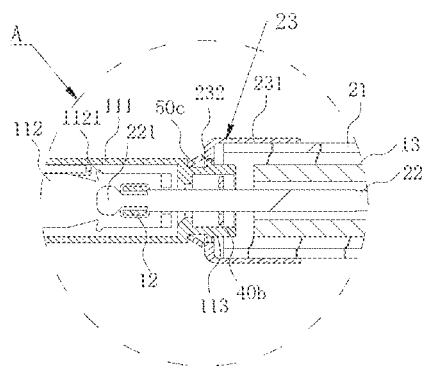
FIG. 5 is an enlarged schematic diagram of part A in FIG. 4.

Referring to FIG. 1 to FIG. 5, one of the preferred embodiments of the present disclosure provides a multi-processing device for an endoscope 100, which may not interfere with an inner wall of the conveying pipe 21, and may effectively repeat an opening and closing operation. Wherein, FIG. 1 is a structural schematic diagram of the multi-processing device for an endoscope 100 in a first viewing angle in one embodiments of the present disclosure, FIG. 2 is a sectional view of the multi-processing device for an endoscope 100 shown in FIG. 1, FIG. 3 is a structural schematic diagram of the multi-processing device for an endoscope 100 in a second viewing angle shown in FIG. 1, FIG. 4 is a sectional view of the multi-processing device for an endoscope 100 shown in FIG. 3, FIG. 5 is an enlarged schematic diagram of part A in FIG. 4.

The multi-processing device for an endoscope 100 may include a conveying component, a control component, a processing unit 11 and a first limit part 40b and a second limit part 50c.

Specifically, the conveying component may include a conveying pipe 21, a control member 22, and a mounting part 23.

At least one processing unit 11 may be accommodated in the conveying pipe 21 to continuously release a plurality of processing units 11 when extending into an organism at one time. Preferably, a number of processing units 11 may be set to 2 to 10.

The conveying pipe 21 may be preferably, but not limited to, a spring hose, and its outside may also be provided with a sleeve, which may be made of flexible material. In this embodiment, the conveying pipe 21 may include a first pipe 211 and a second pipe 212 connected with a proximal end of the first pipe 211. The first pipe 211 may be wound by flat wires and the second pipe 212 may be wound by round wires. For example, the first pipe 211 may be wound by metal wires with a quadrilateral section. Compared with the second pipe 212 wound by circular metal wires with a circular section, on a premise of having a same outer diameter, a thickness of a wall of the first pipe 211 may be smaller and has a larger inner diameter, which is convenient for movements of the processing units 11 in the first pipe 211. At the same time, the first pipe 211 may have a strong driving force, which is convenient for clamping a distal end of the conveying pipe 21 in an organism.

In this embodiment, the first pipe 211 and the second pipe 212 may be fixed by welding. It can be understood that in other embodiments, the first pipe 211 and the second pipe 212 may also be fixed by a screw connection, a riveting connection, a gluing connection, or a clamping connection. The advantage of the sectional design is that it can reduce the overall manufacturing cost of the conveying pipe 21 while ensuring the necessary driving force and accommodating space.

The control member 22 may pass through the conveying pipe 21 and may drive the processing units 11 to switch from a combination configuration to a release configuration, wherein in the combination configuration, a most distal processing unit among the processing units is connected with the distal end of the conveying pipe, and in the release configuration, the most distal processing unit is separated from the distal end of the conveying pipe. The control member 22 may be a rope or a pipe wound by a plurality of metal wires with good torque transmission performance, an individual wire, or an individual pipe. Its diameter may be 0.2 mm~1.0 mm, which may realize 1:1 torque transmission. The control member 22 may move and rotate back and forth in the conveying pipe 21, and drive a processing unit 11 connected with it to move and rotate back and forth synchronously.

The mounting part 23 may be fixed to the distal end of the conveying pipe 21 and may include a baffle 232 extending towards an axial center of the conveying pipe 21. Before being released, each processing unit 11 accommodated in the conveying pipe 21 may need to pass through the baffle 232 and clamp with the baffle, so that the opening, closing and rotation of clamping arms 112 may be realized by the control member 22. After the processing unit 11 are released the clamping with the baffle, it may be released from the conveying pipe 21 and enter the organism.

The control component may include a handle part 31 and a sliding part 32 sleeved on the handle part 31. The handle part 31 may be connected with a proximal end of the conveying pipe 21 to drive a synchronous movement of the conveying pipe 21. The sliding part 32 may be connected with a proximal end of the control member 22 and drive the control member 22 and the processing unit 11 to move synchronously. In this way, a user may adjust an angle and a distance between the processing unit 11 and the lesion by moving the handle part 31 and the sliding part 32 according to needs of the lesion, to better align the lesion and clamp tissue.

The processing unit 11 may include a capsule body 111 and clamping arms 112, proximal ends of the clamping arms 112 may be accommodated in the capsule body. In the combination configuration, the proximal ends of the clamping arms 112 may be connected to the control member 22 and may move back and forth relative to an axial direction of the capsule body 111 under the control member 22. At the same time, distal ends of the clamping arms 112 may switch between the open configuration and the closed configuration. After the clamping operation is completed, the processing unit 11 may be in a closed configuration and fixed to the capsule body 111.

In order to enable the distal end of the control member 22 to load smoothly and effectively with a next processing unit 11 after releasing a prior processing unit 11, and enable each processing unit 11 to realize repeated opening, closing, and operation, so as to clamp the lesion more efficiently. The multi-processing device for an endoscope 100 may be provided with the first limit part 40b and the second limit part 50c.

The first limiting part 40b may be arranged at a proximal end of the capsule body 111 and may elastically deform or fail under an action of external force, which correspond to clamping or releasing the clamping with the baffle, respectively. The first limiting part 40 may be located at a proximal end of the baffle 232 and clamped to the baffle 232, which may limit the movement of the processing unit 11 towards the distal end of the conveying pipe 21. In the combination configuration, the control member 22 may move the clamping arms 112 to form the open configuration and the closed configuration. In the release configuration, the first limit part 40 may deform under the control member 22 and may release the clamping with the baffle 232.

The first limit part 40b may be set with a relatively small outer diameter to effectively clamp with the baffle, so that the processing unit 11 may not interfere with or jam the inner wall of the conveying pipe 21, and may ensure a smooth movement of the processing unit 11 in the conveying pipe 21. The first limit part 40b and the capsule body 111 may be arranged separately or integrally.

In this embodiment, the second limit part 50c may be sleeved at the proximal end of the capsule body 111 and pass through the baffle 232 together with the capsule body 111, and the first limit part 40b may be maintained at the distal end of the conveying pipe 21. In the combination configuration, the second limit part 50 located at a distal end of the baffle 232 may abut against the distal end of the baffle 232 to limit a movement of the capsule body 111 towards the proximal end of the conveying pipe 21. The first limit part may be located in the baffle 232 and clamped to the baffle 232, and the control member 22 may move the clamping arms 112 to form the open configuration and closed configuration. In the release configuration, the first limit part may deform under the control member 22 and may release the clamping with the baffle 232. In this way, the first limit part 40 may be better clamped with the proximal end of the baffle 232 when expanding, so as to avoid the adverse effect caused by too large or too small radial deformation of the first limit part 40.

It should be noted that in other embodiments, the second limit part 50 may also be arranged at the distal end of the conveying pipe 21 and located at the proximal end of the baffle 232 in the combination configuration. Alternatively, a number of the second limit parts 50 may be set to two and the second limit parts 50 may located at the distal end of the conveying pipe 21 and the proximal end of the capsule body 111 at the same time.

That is, the second limit part may be arranged at the distal end of the conveying pipe 21 and located in the baffle 232 in the combination configuration, the second limit part may also be arranged at the proximal end of the capsule body 111 and outside the baffle 232 in the combination configuration, or the second limit part may also be arranged at the distal end of the conveying pipe 21 and the proximal end of the capsule body 111 at the same time, so as to play a double limit. Specifically, in the combined configuration, the second limit part may expand or contract outward along the conveying pipe 21 radially and abut against the baffle 232 so that the capsule body 111 may pass through, while the expanded first limit part may be limited at the proximal end of the conveying pipe 21 so that the processing units 11 may be opened or closed.

Further, a diameter of the through hole formed by the baffle 232 may be greater than a distal outer diameter of the first limit part and smaller than a proximal outer diameter of the second limit part.

In the multi-processing device for an endoscope 100, after a clamping operation is realized, the user may pull a sliding ring 322 towards the proximal end of the conveying pipe 21 to close the clamping arms 112 and lock it in the capsule body 111, and then continue to apply a driving force towards the proximal end of the conveying pipe 21. When the applied driving force is greater than a preset driving force value, the distal end of the control member 22 may be disconnected with the clamping arms 112, the first limit part 40b may elastically retract or deform, and disengage from the clamping with the baffle, so that the release of one processing unit 11 may be completed. Repeat this operation and continue to complete the releases of the processing units 11 accommodated in the conveying pipe 21.

In FIG. 5, the mounting part 23 may be fixed at the distal end of the conveying pipe 21. The mounting part 23 and the conveying pipe 21 may be integrally formed or separated, and fixed by a screw connection, a welding, a riveting, a gluing, or other means.

The mounting part 23 may include a seat body 231 and the baffle 232 formed by a transition from a distal end of the seat body 231 to an axial center of the seat body 231. The seat body 231 may be sleeved on the distal end of the conveying pipe 21 and an inner cavity (not shown in the figure) may be formed in the seat body 231. The baffle 232 may be provided with a first through hole for the capsule body 111 and the second limit part 50c to pass through, which is used to limit the first limit part.

Figure 6:
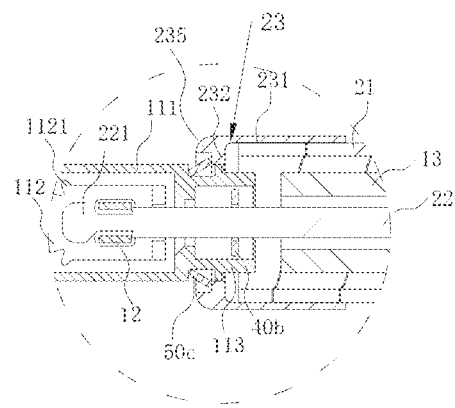
FIG. 6 is a structural schematic diagram of FIG. 5 in another embodiment.

Referring to FIG. 6, FIG. 6 is a structural diagram of FIG. 5 in another embodiment. The structure of FIG. 6 may be substantially the same as that of FIG. 5, except that the mounting part 23 may include a flange 235 arranged at a distal end of the baffle. The flange 235 may extend from a surface of a distal end of the baffle 232 towards a distal end of the mounting part 23, and a stepped surface (not shown) may be formed between an inner surface of the flange 235 and the surface of the distal end of the baffle 232 to limit an excessive outward expansion of a proximal end of the second limit part 50c.

Specifically, in the combination configuration of the processing unit 11, the capsule body 111 and the second limit part 50c may be penetrated from the first through hole, and the second limit part 50c may abut against the surface of the distal end of the baffle 232. Since the proximal end of the second limit part 50c may expand outward relative to the distal end and may have a large outer diameter, there may be no contact between the proximal end of the second limit part 50c and an outer wall of the capsule body 111. When subjected to the driving force towards the proximal end of the conveying pipe 21, the second limit part 50c may shake and the structure may be not stable enough.

The flange 235 may be arranged so that the proximal end of the second limit part 50c may be accommodated at the distal end of the mounting part 23, and an inner surface of the flange 235 may limit an edge of the proximal end of the second limit part 50c to prevent excessive shaking. The structure may be relatively stable.

Figure 7:
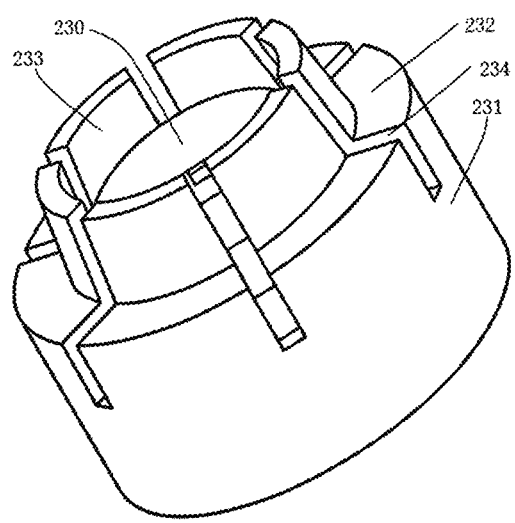
FIG. 7 is a structural diagram of a mounting part provided in one embodiment.
Figure 8:
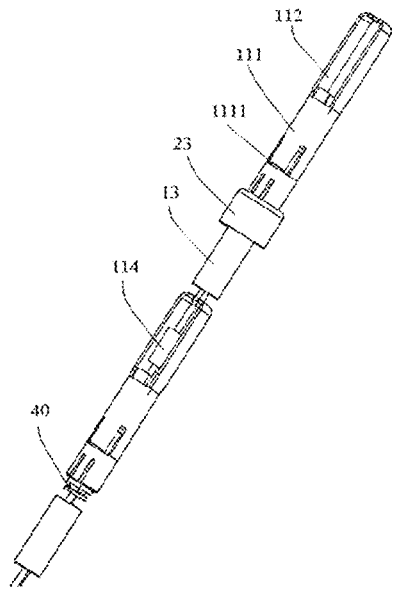
FIG. 8 is a structural diagram of the multi-processing device for an endoscope after a part of the multi-processing device is hidden.

Referring to FIG. 7 and FIG. 8 together. FIG. 7 is a structural diagram of the mounting part 23 provided in one embodiment, and FIG. 8 is a structural diagram of the multi-processing device for an endoscope 100 after a part of the multi-processing device is hidden. The mounting part 23 may include tooth parts 233 formed by axial transition from the baffle 232. The mounting part 23 may be provided with a plurality of fourth through holes 234, the plurality of fourth through holes 234 may be arranged at intervals along a circumferential direction of the mounting part 23. Each fourth through hole 234 may penetrate distal ends of the tooth parts 233 and transition to the baffle 232 and the seat body 231, so that the tooth parts 233 may expand and contract along the radial direction of the mounting part 23. With this arrangement, the plurality of fourth through holes 234 may split upper tooth parts 233 of the mounting part 23 along the radial direction of the mounting part 23 and enable the tooth parts 233 to expand outward when subjected to a radial outward supporting force. The arrangement of the plurality of fourth through holes 234 may be easier for the elastic deformation of the mounting part 23 itself.

Figure 9A:
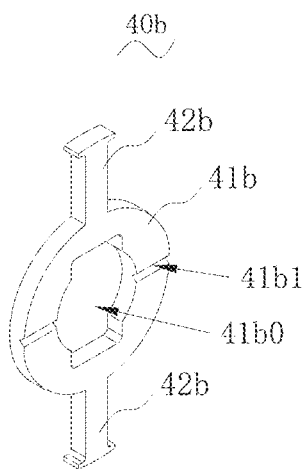
FIG. 9(*a*) is a three-dimensional structural diagram of the first limit part provided in one embodiment.
Figure 9B:
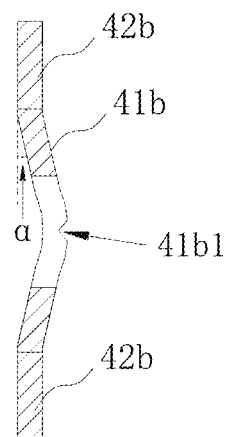
Figure 9C:

Referring further to FIG. 9(a) to FIG. 9(c), FIG. 9(a) is a three-dimensional structural diagram of the first limit part provided in one embodiment; FIG. 9(b) is a schematic diagram of the first limiting part in a stressed and deformed state in one embodiment; FIG. 9(c) is a schematic diagram of the first limiting part in a stressed and failure state in one embodiment.

The first limit part 40b may include a first base part 41b and a first convex part 42b. The first base part 41b may be accommodated at the proximal end of the capsule body 111, and the first convex part 42b may be connected to the first base part 41b and extend outward, and the first convex part 42b may extend out of a sidewall of the capsule body 11 and be limited to a proximal side of the baffle. Preferably, a number of the first convex parts 42b may be set to two and connected to both ends of the first base part 41b, respectively. Considering a force balance of the first limit part 40b to better limit the baffle 232, the two first convex parts 42b may be located on a same axis and arranged symmetrically.

Preferably, an included angle between surfaces of the first base part 41b and the first convex part 42b a may be smaller than or equal to 30°, the first base part 41b may be bent towards a proximal end or towards a distal end relative to the first convex part 42b. In order to make the first limit part 40b easy to deform, the first base part 41b and the first convex part 42b may be preferably located in the same plane.

In order to facilitate deformation or failure of the first limit part 40b, so that the processing units 11 may be separated from a limit with the baffle 232 and released from the conveying pipe 21, a surface of a proximal end of the first base part 41b may be provided with a variable part 41b1, and the variable part may be configured to cause the first base part to deform or fail when the first base part 41b is stressed.

The variable part 41b1 may be an opening or groove arranged on the first base part 41b. Preferably, the variable part 41b1 may be substantially in a groove shape and penetrate the surface of the proximal end of the first base part 41b. More preferably, the variable part 41b1 may be located on a central axis of the first base part 41b and perpendicular to an axis direction of the two first convex parts 42b. It should be noted that the variable part 41b1 may also be arranged at other positions on the surface of the proximal end of the first base part 41b, and may be in a non-penetrating hole or groove shape. Under a premise of not affecting the deformation or failure of the first limit part 40b under force, the present application does not limit the structure and installation position of the mutation portion 41b1, the structure and setting position of the variable part 41b1 are not limited in this application.

The center of the first base 41b may form a second through hole 41b0 for the control member 22 to pass through. The distal end of the control member 22 may pass through the second through hole 41b0 and may be connected with the processing unit 11 to drive a synchronous movement of the processing unit 11. The distal end of the control member 22 may not rotate relative in the second through hole 41b0. A distal section of the control member 22 may be arranged in a non-circular structure, and its cross section may be substantially rectangular, and a proximal section of the control member 22 may be arranged in a cylindrical structure, which may be convenient for synchronous movement in the conveying pipe 21 and not affect other unloaded processing units 11.

Referring to FIG. 10, FIG. 10 is a structural diagram of the control member in one embodiment. The distal end of the control member 22 may be successively provided with a head part 221, a concave part 222 and a shoulder part 223 from far to near, so that the control member 22 may drive a most distal processing unit 11 in the plurality of processing units to move synchronously. Outer diameters of components of the control member 22 other than the head part 221 may be smaller than an inner diameter of a circular hole.

In order to facilitate the control member 22 to pass through from the proximal side to the distal side of the first base part 41b, retain a mutagenic effect of the first limit part 40b, and improve an assembly efficiency, a shape of the second through hole 41b0 may be adapted to the distal end of the control member 22. A minimum inner diameter of the second through hole 22 may be smaller than a maximum outer diameter of the head part 221 and may be substantially rectangular hole, and two long sides of the cross section of the second through hole 41b0 may be convex respectively and form the circular hole. The diameter of the circular hole may be larger than an outer diameter of the proximal end of the control member 22, so that the proximal end of the control member 22 may rotate in the second through hole 41b0. The diameter of the circular hole may be smaller than the maximum outer diameter of the head part 221 of the control member 22, thereby limiting the movement of the head part 221 towards the proximal end of the first base part 41b and a rotation in the second through hole 41b0. During assembly, the head part 221 may pass through the rectangular hole from the proximal side to the distal side of the first base part 41b, and then may rotate the control member 22. The outer diameters of the components of the control member 22 except the head part 221 may be smaller than an inner diameter of the circular hole, so that it may pass through. After the head part 221 rotates for a certain angle, the head part 221 may abut against a peripheral wall of the second through hole 41b0, so it may be impossible to withdraw from the second through hole 41b0 in a reverse direction. It should be noted that the direction of reverse withdrawal may refer to a reverse direction of travel when the head part 221 passes through the second through hole 41b0.

Referring also to FIG. 11 to FIG. 13, FIG. 11 to FIG. 13 are structural diagrams of the second limit part in different embodiments. The second limit part 50a provided in FIG. 11 may be a cylindrical spring. The second limit part 50b provided in FIG. 12 may be a tower spring, and an outer diameter of the tower spring gradually may decrease in a direction towards the distal end of the conveying pipe 21. The second limit part 50c provided in FIG. 13 may be provided with a first opening 53, which may transition along an axis direction of the second limit part 50c to provide deformation allowance and facilitate a radial elastic deformation of the second limit part 50c itself.

As shown in FIG. 12 and FIG. 13, the inner diameters of the second limit part 50b or 50c may decrease from the proximal end of the conveying pipe 21 to the distal end of the conveying pipe 21.

In one embodiment, the second limit part 50 may be arranged at the distal end of the conveying pipe 21 and accommodated on the proximal end side of the baffle 232. In a state of no radial force acting on the second limit part 50, an inner diameter of a distal end of the second limit part 50 may be smaller than an outer diameter of the processing unit 11, and an inner diameter of a proximal end of the second limit part 50 may be larger than the outer diameter of the processing unit 11.

In one embodiment, the sidewall of the second limit part 50 may be provided with a first opening 53 which may provide deformation allowance, and the first opening 53 passes through the sidewall of the second limit part 50; and/or, the sidewall of the second limit part 50 may also be provided with one or more second openings 54, the one or more second openings 54 extends from a surface of a proximal end of the sidewall of the second limit part 50 to the sidewall of the second limit part 50, the number of the one or more second openings 54 exceeds 1, and the one or more second openings 54 may be arranged at intervals along the circumferential direction of the second limit part 50.

The arrangement of the first opening 53 and/or the one or more second openings 54 may reduce a radial reaction force of a distal end of the second limit part 50 when passing through the baffle 232, so that the second limit part 50 may be pushed out from the conveying pipe 21. It should be noted that after the second limit part 50 is pushed out from the baffle 232, its distal end resumes radially outward expansion to better abut against a distal side of the baffle 232.

Figure 14:
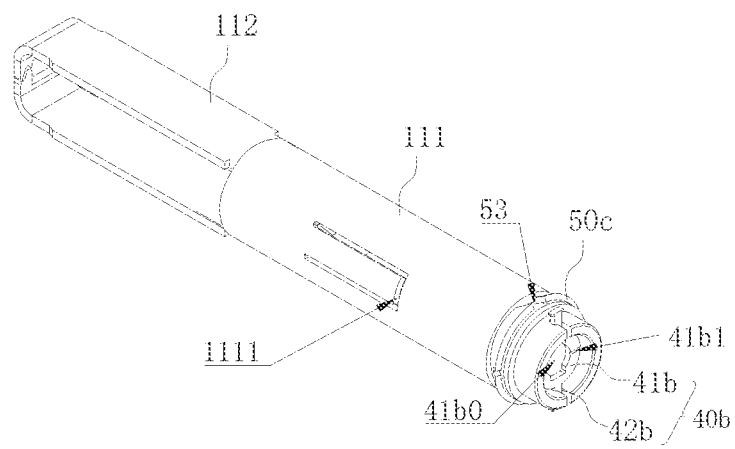
FIG. 14 is an assembly diagram of the processing unit, the first limit part and the second limit part in one embodiment.

Referring also to FIG. 14, FIG. 14 is an assembly diagram of the processing units 11, the first limit part 40b and the second limit part 50c in one embodiment. The first limit part 40b may be accommodated at the proximal end of the capsule body 111 to abut against a surface of a proximal end of the baffle 232, and the second limit part 50c may be sleeved at the proximal end of the capsule body 111.

Figure 15:
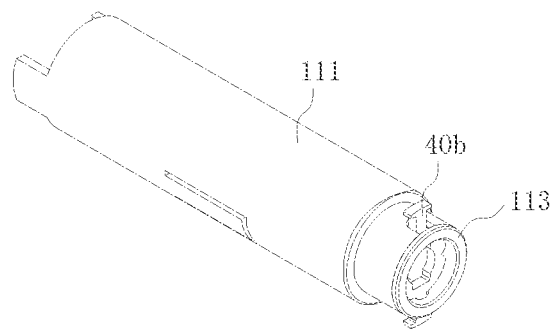
FIG. 15 is an assembly diagram of the capsule body and the first limit part.
Figure 16:
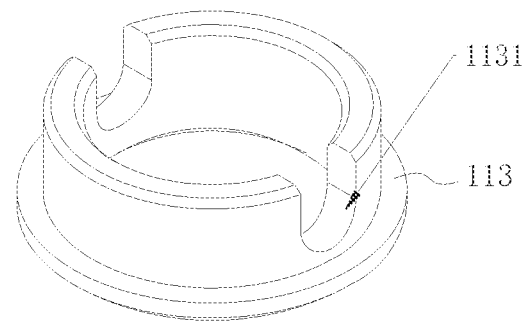
FIG. 16 is a three-dimensional structural diagram of the base in one embodiment.

Referring also to FIG. 15 and FIG. 16, FIG. 15 is an assembly diagram of the capsule body and the first limit part, FIG. 16 is a three-dimensional structural diagram of the base in one embodiment. In order to facilitate the assembly of the first limit part 40b, the processing units 11 may also include a base 113, which is fixed at the proximal end of the capsule body 111, an accommodation cavity for accommodating the first base part 41b may be provided in the base 113, and a third through hole 1131 for the first convex part 42b may be arranged on the sidewall of the base 113. Preferably, the base 113 and the proximal end of the capsule body 111 may be fixed by welding.

Figure 17:
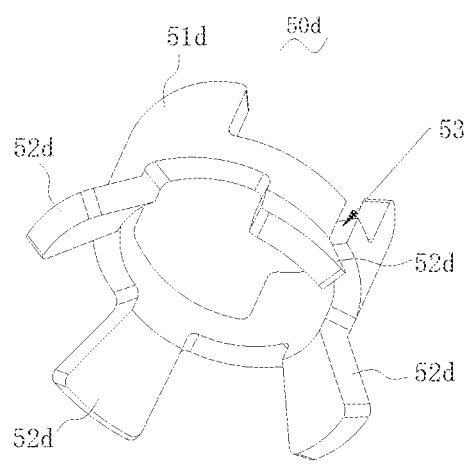
FIG. 17 is a structural diagram of the second limit part in one embodiment.
Figure 18:
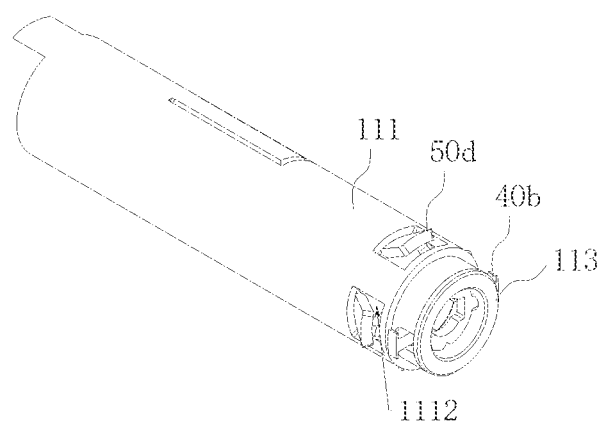
FIG. 18 is an assembly diagram of the processing unit, the first limit part and the second limit part in one embodiment.
Figure 19:
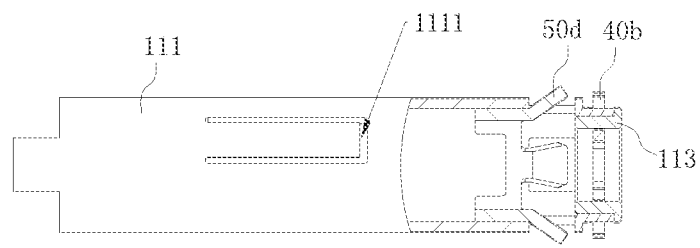
FIG. 19 is another perspective diagram of FIG. 18.

Referring also to FIG. 17 to FIG. 19, FIG. 17 is a structural diagram of the second limit part in one embodiment; FIG. 18 is an assembly diagram of the processing unit, the first limit part and the second limit part in one embodiment; FIG. 19 is another perspective diagram of FIG. 18.

When the second limit part 50d is arranged at the distal end of the baffle 232, in addition to the above presentation form, it may also have a structure as shown in FIG. 14. The second limit part 50d may include one or more second base parts 51d and one or more second convex parts 52d. The one or more second base parts 51d may be accommodated in the capsule body 111. The one or more second convex parts 52d may extend outward, and the one or more second convex parts 52d may extend out of a sidewall of the capsule body 111 and limit the baffle 232. The one or more second base parts 51d may be fixedly connected with the inner wall of the capsule body 111, which may be fixed by welding, riveting, clamping, hinge, etc.

Further, the one or more second base parts 51d may be provided with a first opening 53 to facilitate the passage of the second limit part 50d from the baffle 232. Preferably, a number of the one or more second convex parts 52d may exceed 1, and the one or more second convex parts may be arranged at intervals along a circumferential inward direction of the second base part 51d. Accordingly, the sidewall of the capsule body 111 may be provided with a plurality of opening pores 1112 for the one or more second convex parts 52d to extend.

Figure 20:
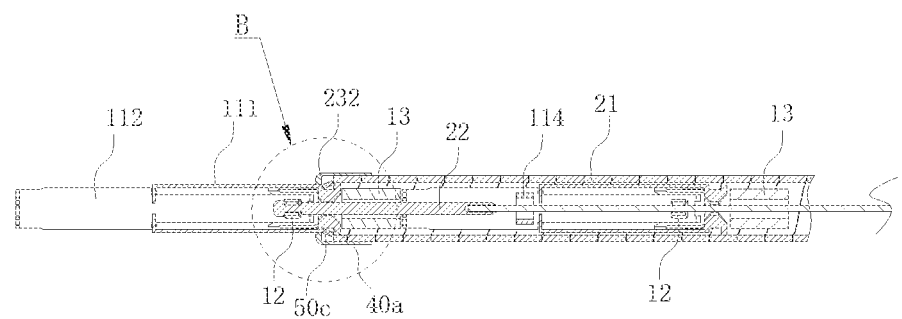
FIG. 20 is a sectional view of the multi-processing devices for an endoscope shown in one embodiment.
Figure 21:
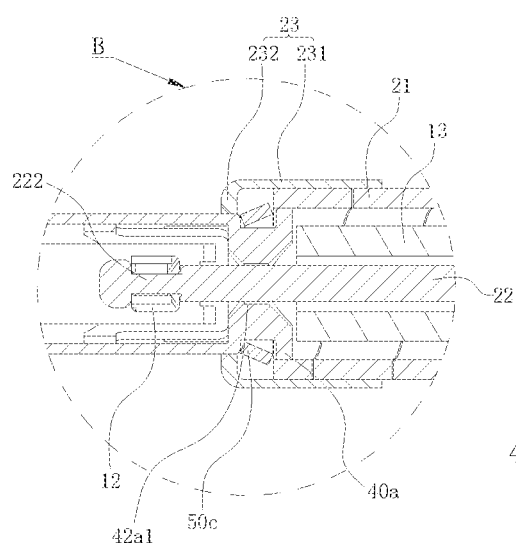
FIG. 21 is an enlarged schematic diagram of part B in FIG. 20.
Figure 22:
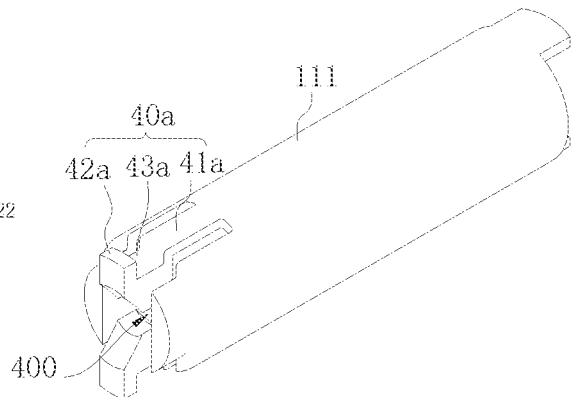
FIG. 22 is an assembly diagram of a capsule body and a first limit part.

Referring also to FIG. 20 to FIG. 22, FIG. 20 is a sectional view of the multi-processing device for an endoscope 100 shown in one embodiment, FIG. 21 is an enlarged schematic diagram of part B in FIG. 20, and FIG. 22 is an assembly diagram of a capsule body 111 and a first limit part 40a.

In order to enable the distal end of the control member 22 to load smoothly and effectively with a next processing unit 11 after releasing a prior processing unit 11, and enable each processing unit 11 to realize repeated opening, closing, and operation, so as to clamp the lesion more efficiently. An inner surface of the first limit part 40a of the preferred embodiment may form a lumen 400 for the control member 22 to pass through, and the distal end of the control member 22 may pass through the lumen 400 and may be connected to the processing unit 11. The first limit part 40a may be elastically deformed under a resisting action of the control member 22 and expand outward along a circumferential direction of the capsule body 111 to connect with the distal end of the conveying pipe 21 through clamping. When the control member 22 is driven to the proximal end of the conveying pipe 21 through a large tensile force, the control member 22 may be separated from the lumen 400, and the first limit part 40a may contract along the circumferential direction of the capsule body 111 to release the clamping with the distal end of the conveying pipe 21. At this time, the capsule body 111 and the first limit part 40a may be released from the distal end of the conveying pipe 21.

Specifically, a center of the first limit part 40a may form a lumen 400 for the control member 22 to pass through, the distal end of the control member 22 may pass through the lumen 400 and may be connected to the processing unit 11, and the second limit part 50c may be located at the distal end of the conveying pipe 21 and limited to a proximal side the baffle 232.

In further detail, the first limit part 40a may include an extending part 41a, a clamping hole part 42a and a concave part 43a. The extending part 41a may be connected to the sidewall of the capsule body 111, and the clamping hole part 42a may be connected to a proximal end of the extending part 41a. An inner surface of the clamping hole part 42a may extend inward and form a clamping convex part 42a1. The clamping convex part 42a1 may be elastically deformed under the resisting action of the control member 22 and expand outward along the radial direction of the capsule body 111 to connect with the distal end of the second limit part 50c through clamping. An outer surface of the concave part 43a may be against an inner surface of the second limit part 50c, a surface of a distal end of the clamping hole part 42a may abut against a surface of the proximal end of the second limit part 50c, and a surface of a proximal end of the extending part 41a may abut against a surface of the distal end of the second limit part 50c.

With this arrangement, the capsule body 111 may be more firmly connected with the distal end of the baffle 232 through clamping without increasing an outer diameter of the capsule body 111. In addition, when the first limit part 40a and the control member 22 are not connected, the clamping hole part 42a may retract elastically and may not interfere with or jam an inner wall of the conveying pipe 21, which is conducive to the free conveying of the processing unit 11 in the cavity of the small conveying pipe 21 when the endoscope clamp channel is bent more than 180°.

Further, the proximal end of the extending part 41a may be flush with the proximal end of the capsule body 111, and there may be a gap between the extending part 41a and the sidewall of the capsule body 111. It is understood that the extending part 41a may also be connected to the proximal end of the capsule body 111.

An inner diameter of a proximal side of a central through hole of the second limit part 50c may be smaller than an outer diameter of the clamping hole part 42a and greater than or equal to the outer diameter of the capsule body 111. At the same time, an inner diameter of the central through hole of the second limit part 50c may decrease from the proximal end of the second limit part 50c to the distal end of the second limit part 50c, so that the processing unit 11 may be driven to move to the distal end of the conveying pipe 21 and generate a driving force to expand the second limit part 50c radially, so that after the capsule body 111 passes through the second limit part 50c, it may not move back and forth along a length direction of the conveying pipe 21, thus, the processing unit 11 may be held at the distal end of the conveying pipe 21 by the first limit part 40a and the second limit part 50c.

Further, an inner diameter of the first through hole 230 may be greater than an outer diameter of the distal end of the second limit part 50c and smaller than an outer diameter of the proximal end of the second limit part 50c.

In the combination configuration, the distal end of the second limit part 50c may abut against a stepped surface between the clamping hole part 42a and the concave part 43a, the proximal end of the baffle 232 may abut against the surface of distal end of the first limit part 40a, the control member 22 may move the clamping arms 112 to form the open configuration and the closed configuration, and the outer diameter of the first limit part 40a may be greater than the larger of the diameter of the first through hole 230 and the inner diameter of the second limit part 50.

In the release configuration, a proximal end of the sliding part 32 may move to release a combination relationship between the control member 22 and the processing unit 11 and a combination relationship between the control member 22 and the first limit part 40a. When the control member 22 is driven to the proximal end of the conveying pipe 21 through a large driving force, the control member 22 may be separated from the lumen 400, and the first limit part 40a may shrink inward along a radial direction of the capsule body 111 to release the clamping hole part 42a from the distal end of the second limit part 50c, the combination of the first limit part 40a and the baffle 232 may fail, and the outer diameter of the first limit part 40a may be smaller than the smaller of the diameter of the first through hole 230 formed by the baffle 232 and the inner diameter of the second limit part 50. At this time, the capsule body 111 and the first limit part 40a may be released from the distal end of the conveying pipe 21.

The extending part 41a and the sidewall of the capsule body 111 may be integrally formed or separately arranged, and connected to the sidewall of the capsule body 111 by a screw connection, a welding connection, a riveting connection, or other common fixing methods. This embodiment is not limited to this.

In the preferred embodiment, a number of the first limit parts 40a may be set as multiple, and the multiple first limit parts 40a may be arranged symmetrically with respect to the sidewall of the capsule body 111. On a premise that the first limit parts 40a may expand or contract elastically, the present application does not limit the number and arrangement of the first limit parts 40a.

Of course, the multiple first limit parts 40a may also be arranged at intervals along the circumferential direction of the capsule body 111. Preferably, the number of the first limit parts 40a may be set to two and may be symmetrically arranged with respect to the circumferential direction of the capsule body 111. It may be understood that in other embodiments, the number of the first limit parts 40a may be set to more than 3. On the premise that the first limit parts 40a may expand and contract elastically, the present application does not limit the number and arrangement of the first limit parts 40a.

Figure 23:
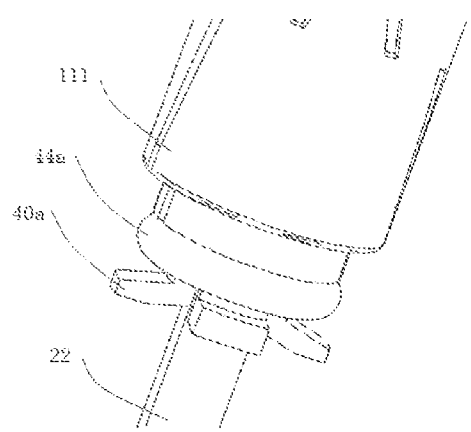
FIG. 23 is an assembly diagram of a capsule body and a first limit part.

Referring to FIG. 23, FIG. 23 is an assembly diagram of a capsule body 111 and the first limit part 40a. In order to facilitate better elastic retraction of the first limit part 40a when it is separated from the control member 22, the processing unit 11 may also include an elastic part 44a sleeved on the concave part 43a, and an inner surface of the elastic part 44a may abut against an outer surface of the concave part 43a.

Through the concave part 43a arranged on the first limit part 40a, the diameter of the first limit part 40a may not interfere with or jam the inner wall of the conveying pipe 21, which is conducive to the free conveying of the processing unit 11 in a small cavity of the conveying pipe 21 when the endoscope clamp channel is bent more than 180°.

The elastic part 44a may be preferably but not limited to an elastic ring. When the control member 22 is connected to the processing unit 11 through the lumen 400, a surface of an inner wall of the clamping convex part 42a1 may abut against a surface of an outer wall of the control member 22, and the first limit part 40a and the elastic part 44a may be in a state of elastic expansion. When the control member 22 is disconnected from the processing unit 11 and separated from the lumen 400, the concave part 43a may shrink radially inward under an elastic force of the elastic part 44a to facilitate the passage of the processing unit 11 from the baffle 232. It can be understood that the first limit part 40a may also be made of elastic material and contract radially inward by relying on its own rebound force.

Further, in order to ensure that the control member 22 may be stably connected with the next processing unit 11, the processing unit 11 may also include a limit structure 114 (as shown in FIG. 20) accommodated in the clamping arm 112. In the closed configuration, the control member 22 may pass through the limit structure 114 and be limited by the limit structure 114 to the direction of the head part 221 against the fastener 12 to make the control member 22 move towards the proximal end of the conveying pipe 22, the circumferential rotation of the control member 22 in the clamping arm 112 may be limited. Preferably, the limit structure 114 may be substantially tubular, and the cross-sectional shape of its central cavity may match the outer surface of the control member 22. A maximum radial outer diameter of the limit structure 114 may be smaller than a minimum gap between the two clamping arms 112 in the closed configuration.

Figure 24:
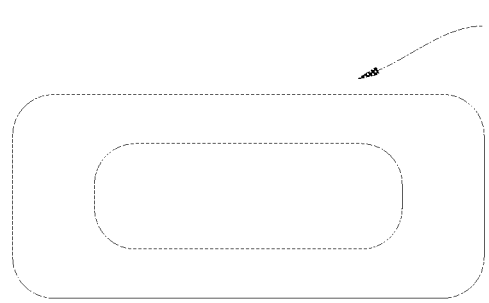
FIG. 24 is a structural diagram of a limit structure in one embodiment.
Figure 25:
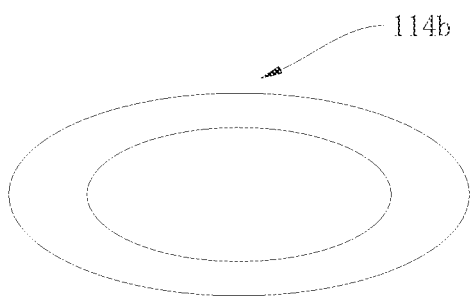
FIG. 25 is a structural diagram of a limit structure in one embodiment.

Referring to FIG. 24 and FIG. 25, FIG. 24 and FIG. 25 are structural diagrams of the limit structure 114 provided for different embodiments. FIG. 24 provides a limit structure 114*a* with a rectangular cross section, FIG. 25 provides a limit structure 114*b* with an elliptical cross section.

After the prior processing unit 11 is released, the control member 22 may be driven towards the proximal end of the conveying pipe 21. Before an effective loading of the distal end of the control member 22 and the next processing unit 11 is completed, if the control member 22 can rotate freely in the conveying pipe 21, it may be detrimental to the effective loading of the distal end of the control member 22 and the next processing unit 11. Therefore, under an action of the limit structure 114, the control member 22 may only move relative to an axis direction of the conveying pipe 21 until the connection with the processing unit 11 is completed. When the clamping arms 112 of the next processing unit 11 are in an open configuration, the limit structure 114 may fall into the organism from the next processing unit 11.

Figure 26:
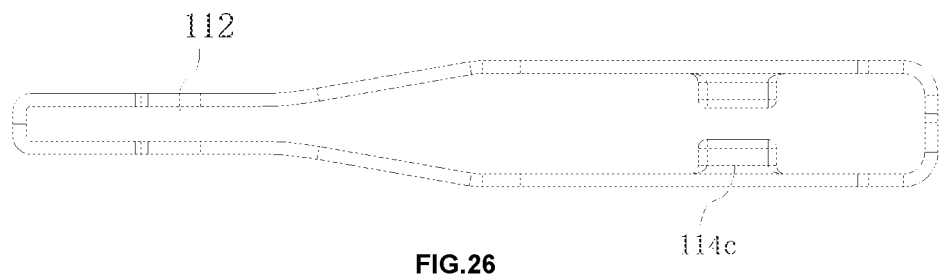
FIG. 26 is a structural diagram of clamping arms in one embodiment.
Figure 27:
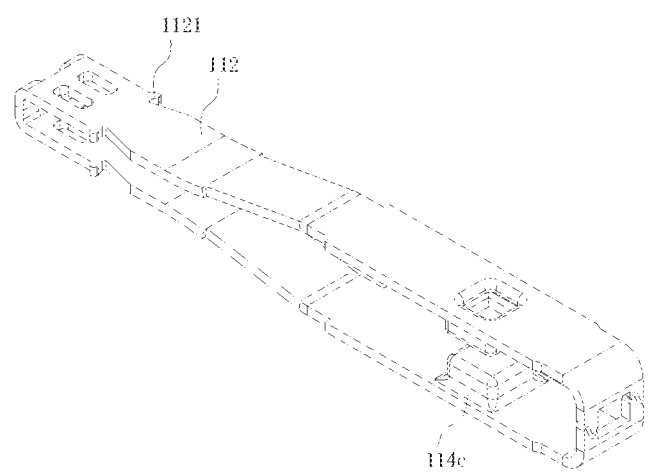
FIG. 27 is a structural diagram of the clamping arms in another viewing angle shown in FIG. 26.

It can be understood that the limit structure 114 may be arranged separately from the clamping arms 112 or integrated with the clamping arms 112. Specifically, Referring to FIGS. 26 and 27, FIGS. 26 and 27 provide a limit structure 114*c* integrally formed with the clamping arms 112. The limit structure 114*c* may be a convex part arranged on an inner wall of the clamping arms 112, and the convex part may be formed by extending part of the inner wall of one clamping arm towards an opposite direction of the other clamping arm, so as to reduce a gap between the two clamping arms, and make a gap between the limit structure 114*c* smaller than the maximum outer diameter of the control member 22, so as to limit the circumferential rotation of the control member 22 relative to the clamping arms 112.

Figure 28:
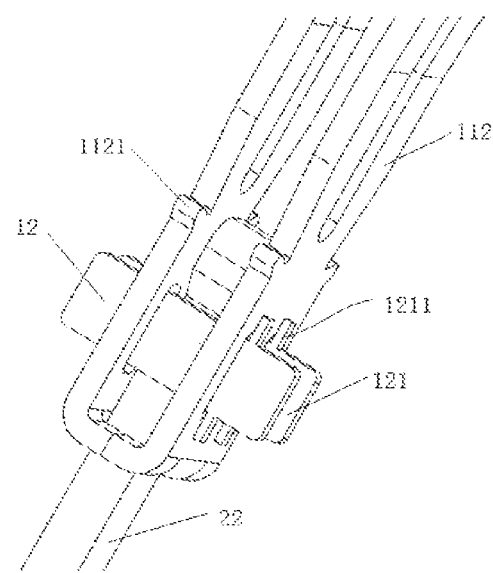
FIG. 28 is a structural diagram of an assembly structure of a fastener, a processing unit, and a control member in one embodiment.

Referring to FIG. 28, FIG. 28 is a structural diagram of an assembly structure of the fastener 112, the processing unit 11, and the control member 22 in one embodiment. The processing unit 11 may include two opposite and spaced clamping arms 112, and the processing unit 11 may include the fastener 12 arranged between the two clamping arms 112. The concave part 222 may be fixed between the two clamping arms 112 through the fastener 12. The fastener 12 may abut against the proximal end of the head part 221 and the distal end of the shoulder part 223, respectively. The fastener 12 may deform or fail outward under a predetermined pressure to release connections between the concave part 222 and the two clamping arms 112. When the force of the fastener 12 exceeds a preset value, the connection between the fastener 12 and the concave part 222 may be slightly deformed or broken, and the control member 22 may fall off the processing unit 11. Further, the distal end of the shoulder part 223 may be inclined inward facing the central axis to ensure that the control member 22 is clamped to the proximal end of the fastener 12, thereby driving the processing unit 11 to rotate.

Specifically, the fastener 12 may include two pin sheets 121, both of which may be provided with two clamping arms 112, and the pin sheets 121 may clamp against two surfaces of the concave part 222 and limit the control member 22. In this embodiment, the two pin sheets 121 may adopt a split structure.

Further, the pin sheets 121 may pass through two clamping arms 112. The pin sheets 121 may include a first end and a second end. The first end may be provided with a block strip 1211, which may be configured to limit the pin sheets 121 and fix the first end on the clamping arm 112, and the second end may be a movable end. With this arrangement, when the fastener 12 may be stressed, the movable end may move towards the first end to provide deformation allowance, so as to facilitate a disconnection of the control member 22 from the fastener 12.

Referring also to FIG. 29, FIG. 29 is a structural diagram of the fastener 112 in one embodiment. In this embodiment, the two pin sheets 121 may be integrally formed and arranged in a U-shape. This arrangement facilitates the installation of the fastener 12 on the clamping arms 112.

Referring also to FIG. 30, FIG. 30 is a structural diagram of an assembly structure of the fastener 112, the processing unit 11, and the control member 22 in one embodiment. The fastener 12 may include a folding part 122 formed by the transition from the clamping arms 112 to the control member 22. Specifically, each clamping arm 112 may be formed with a folding part 122 transiting towards two sides of the concave part 222. The folding part 122 on the two clamping arms 112 may be jointly matched and surrounded with the clamping arms 112 to clamp against the two surfaces of the concave part 222. In the preferred embodiment, the folding parts 122 and the clamping arms 112 may be integrally formed, and the two folding parts 122 on each clamping arm 112 may be formed by a transition of a part of the middle position of the clamping arm 112 towards the concave part 222.

Further, considering that the processing unit 11 may need to remain in the clamping state and release from the distal end of the conveying pipe 21 after clamping a target tissue, it may be necessary to set a self-locking function on the processing unit 11 so that the clamping arms 112 may be locked inside the capsule body 111. The proximal end of the clamping arms 112 may be movably accommodated in the capsule body 111. During a process of pushing the processing unit 11 from the inside of the conveying pipe 21 to the outside through the control member 22, the clamping arms 112 may move relative to the axis direction of the capsule body 111 to adjust spacings and angles between the clamping arms 112 and the target tissue, as well as an opening angle of the clamping arms 112. After the clamping arms 112 has clamped the target tissue, the control member 22 may be operated to the proximal end of the conveying pipe 21 and the clamping arms 112 may be driven to move synchronously, so that the clamping arms 112 may be accommodated in the capsule body 111 and locked, and the clamping arms 112 may be closed.

Figure 33:
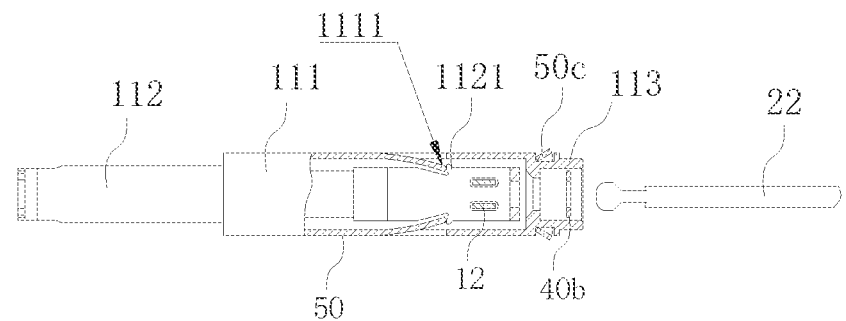
FIG. 33 is a structural diagram of the clamping arms in a self-locking state in one embodiment.

Referring also to FIG. 31 to FIG. 33, FIG. 31 is a structural diagram of the clamping arms 112 in one embodiment; FIG. 32 is a structural diagram of the clamping arms 112 in an active state in one embodiment, and FIG. 33 is a structural diagram of the clamping arms 112 in a self-locking state in one embodiment.

In this embodiment, parts of the sidewalls at the proximal ends of the clamping arms 112 may extend outward and form locking parts 1121. A portion of the sidewall of the capsule body 111 may bend inward and form a clamping hole part 1111 on the sidewall of the capsule body 111. The clamping hole part 1111 may be adapted to the locking parts 1121 and used to restrict a movement of the clamping arms 112 towards the distal end of the capsule body 111. In the active state, the control member 22 may be connected to the clamping arms 112 through the capsule body 111. At this time, the clamping arms 112 may move relative to the axis direction of the capsule body 111. In the self-locking state, the control member 22 may be disconnected from the clamping arms 112, and the distal end of the clamping arms 112 may be closed and locked in the capsule body 111.

Figure 34:
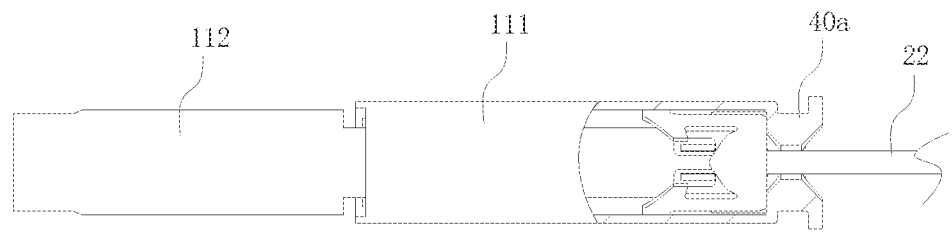
FIG. 34 is a structural diagram of the clamping arms in an active state in one embodiment.
Figure 35:
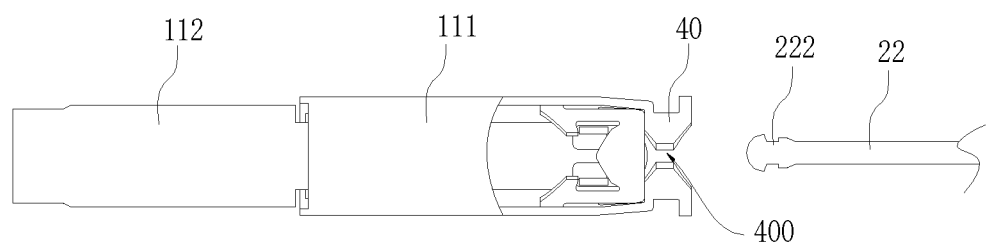
FIG. 35 is a structural diagram of the processing unit in a self-locking state in one embodiment.
Figure 36:
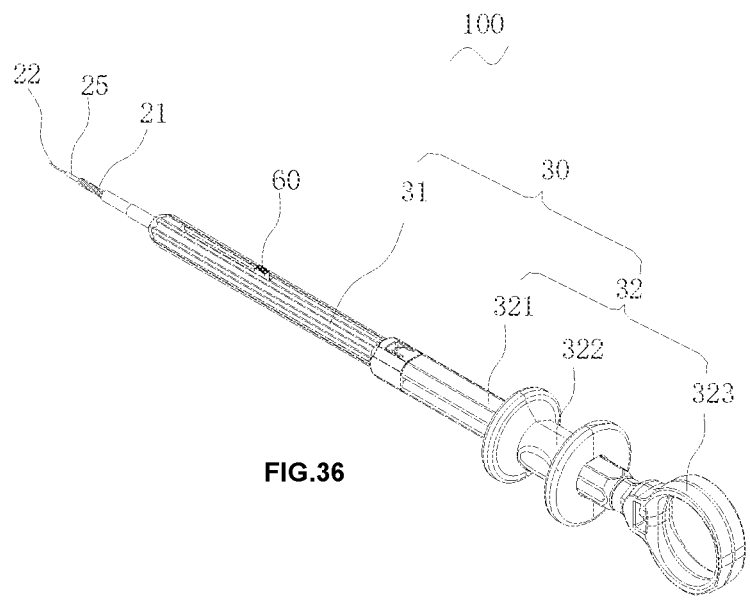
FIG. 36 is a structural diagram of the multi-processing device for an endoscope in one embodiment.
Figure 37:
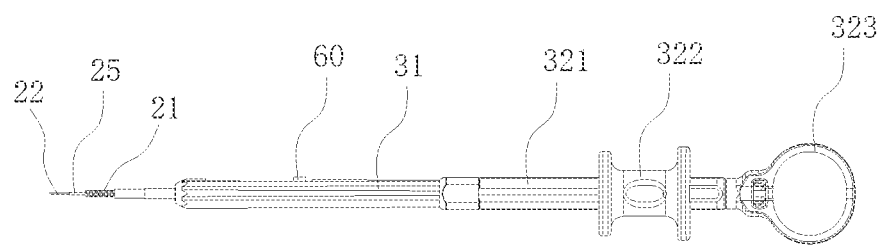
FIG. 37 is a structural diagram of the multi-processing device for an endoscope in the first viewing angle shown in FIG. 36.
Figure 38:
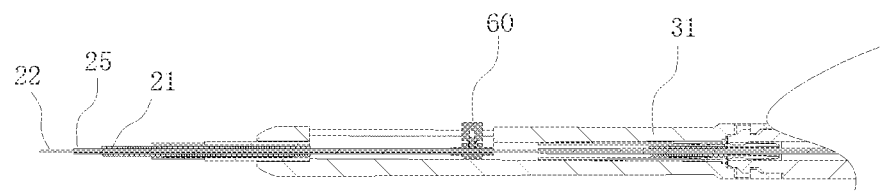
FIG. 38 is a schematic sectional view of FIG. 37.
Figure 39:
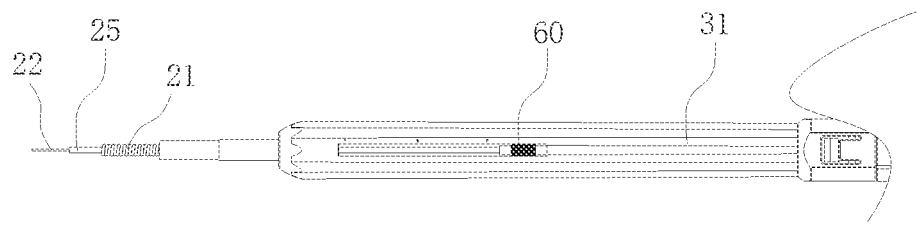
FIG. 39 is a structural diagram of the multi-processing device for an endoscope in the second viewing angle shown in FIG. 36.
Figure 40:
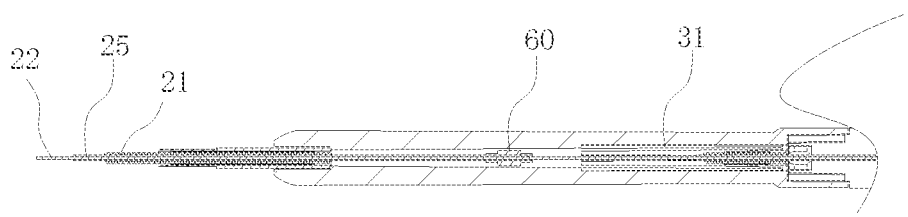
FIG. 40 is a schematic sectional view of FIG. 39.
Figure 41:
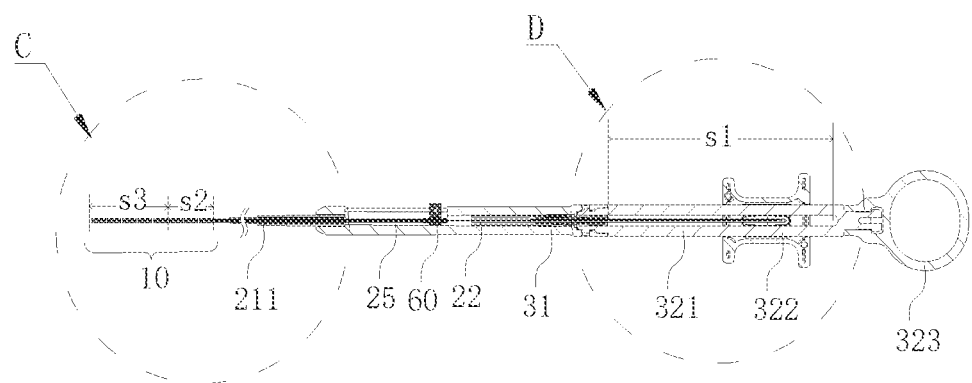
FIG. 41 is a schematic sectional view of the use state of the multi-processing device for an endoscope in one embodiment.
Figure 42:
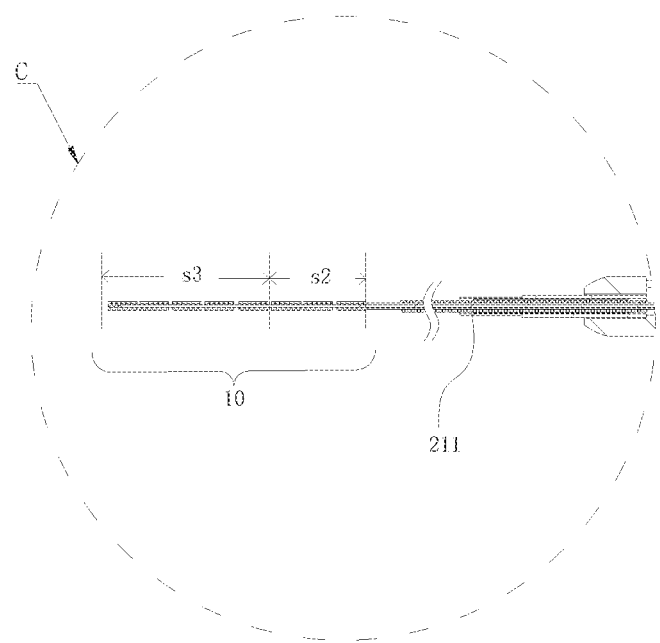
FIG. 42 is an enlarged schematic diagram of part C in FIG. 41.
Figure 43:
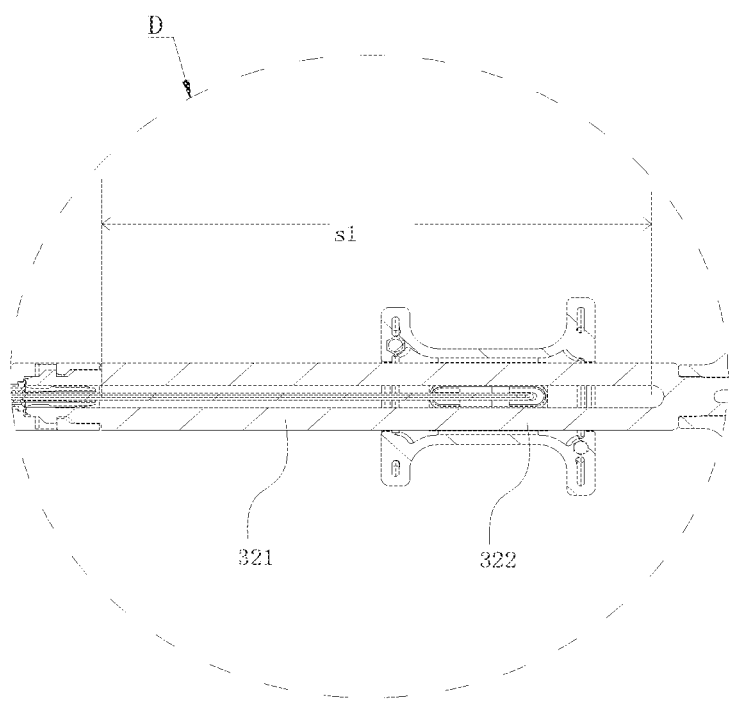
FIG. 43 is an enlarged schematic diagram of part D in FIG. 41.
Figure 44:
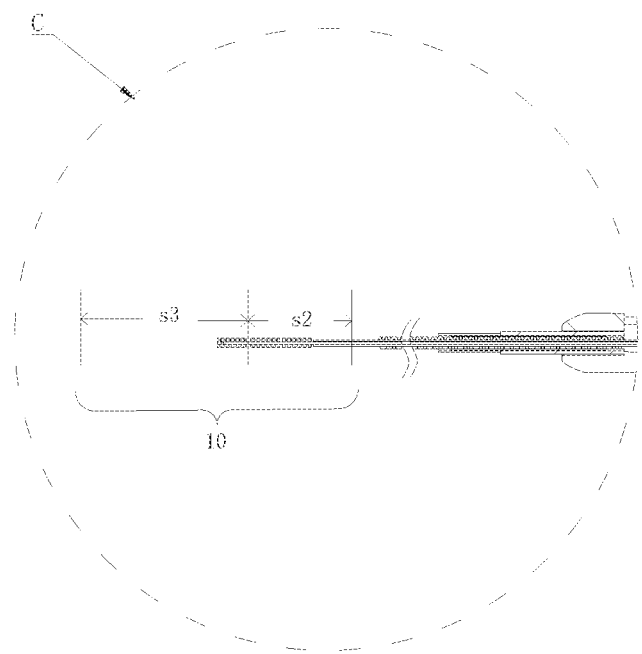
FIG. 44 is another sectional view of the use state of Part C.

Referring also to FIG. 34, FIG. 34 is a structural diagram of the clamping arms in an active state in one embodiment. In this embodiment, by fixing the locking seat 1122 adapted to the proximal end of the clamping arms 112 on the inner wall of the capsule body 111, when the control member 22 is operated in the proximal direction, the proximal end of the clamping arms 112 may be clamped to the locking seat 1122 through a driving force, and the self-locking of the clamping arms 112 may also be realized. The locking seat may be integrally formed with the inner wall of the capsule body 111 or may be arranged separately. It should be noted that the present application does not limit the self-locking mode of the clamping arms 112 under a premise of not affecting the self-locking effect of the clamping arms 112.

A spacer member 13 (as shown in FIG. 20) may be arranged between two adjacent processing units 11. The spacer member 13 may separate two adjacent processing units 11, and the spacer member 13 may be sleeved on the control member 22. With this arrangement, each processing unit 11 may be separated. On the one hand, it may prevent damage caused by the interaction between the processing units 11. On the other hand, when pushing out the processing unit 11, the next processing unit 11 may be prevented from being exposed too much, so that the surface of the capsule body 111 may not be accommodated in the conveying pipe 21, resulting in a failure of the instrument. It is worth noting that an inner diameter of the spacer member 13 may be greater than the outer diameter of the control member 22, so that the control member 22 may smoothly reach a position of the next processing unit 11 from an inner hole of the spacer member 13, so that the next processing unit 11 may be controlled.

Further, for the traditional multi-processing device for an endoscope, the conveying pipe may be provided with a plurality of processing units, and a control member may move back and forth or rotate to drive a processing unit to switch between the combination configuration and the release configuration. The operation component located at the proximal end of the multi-processing device for an endoscope may have a sliding part connected with the proximal end of the control member, and the sliding part may drive the control member to move. In particular, when the processing unit located at the distal end is released, the control member may be connected with the next processing unit by operating the sliding part to the proximal end and driving the control member to move until the processing unit is released, and then the operation of the control member may be repeated by moving the sliding part to continue to release the next processing unit.

However, in practical application, one hand of the user operates the multi-processing device for the endoscope, and the other hand is used to operate the endoscope. Therefore, a moving stroke s1 of the sliding part may be limited by a span of the tiger mouth of the user's palm (a part connected with the thumb and the index finger). Considering the convenience of operation, a moving stroke s3 that the sliding part may drive the control member may be relatively limited. Thus, for the processing unit located in the conveying pipe relatively close to the proximal end, because it may be located outside the moving stroke of the control member, it may be difficult to effectively connect with the control member, which may lead to the inability to accommodate more processing units in the conveying pipe, which may limit the further application of the multi-processing device for an endoscope.

In view of this, Referring to FIGS. 36 to 40, one preferred embodiment of the present disclosure provides the multi-processing device for an endoscope 100, which may accommodate relatively many processing units 11 and effectively load each processing unit.

The multi-processing device for an endoscope 100 may include a processing component 10, including more than two processing units 11, and the proximal end of the processing units 11 may be provided with a first limit part that may deform or fail under an external force. The conveying component 20 may include a conveying pipe 21 for accommodating the processing units 11, a push pipe 25 passing through the conveying pipe 21, and a control member 22 passing through the push pipe 25, wherein a distal end of the push pipe 25 abuts against a processing unit close to the push pipe 25. The control component 30 may include a handle part 31 connected with the proximal end of the conveying pipe 21. The sliding part 32 connected with the proximal end of the control member 22 may control the opening, closing, and release of a distal processing unit 11. And a push component 60 arranged on the handle part 31, wherein the push component 60 may include a fixed seat 61 fixed at the proximal end of the push pipe 25. The handle part 31 may be provided with a chute 312 for sliding the fixed seat 61, and the handle part 31 may be provided with a mark matching with the fixed seat 61 and indicating the number of processing units 11 along the chute 312.

Figure 53:
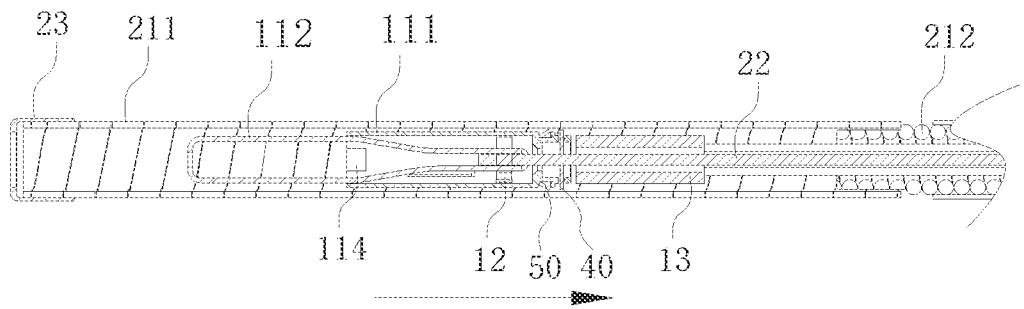
FIG. 53 is a schematic diagram of the use state of the multi-processing device for an endoscope in one embodiment.
Figure 54:
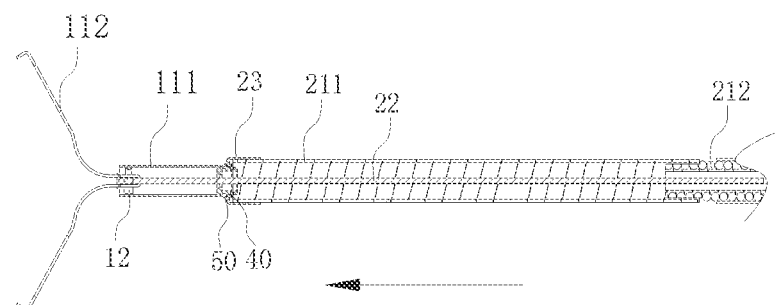
FIG. 54 is a schematic diagram of the use state of the multi-processing device for an endoscope in one embodiment.
Figure 55:
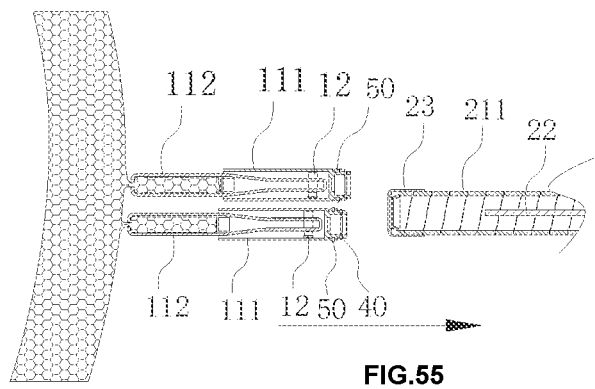
FIG. 55 is a schematic diagram of the use state of the multi-processing device for an endoscope in one embodiment.
Figure 56:
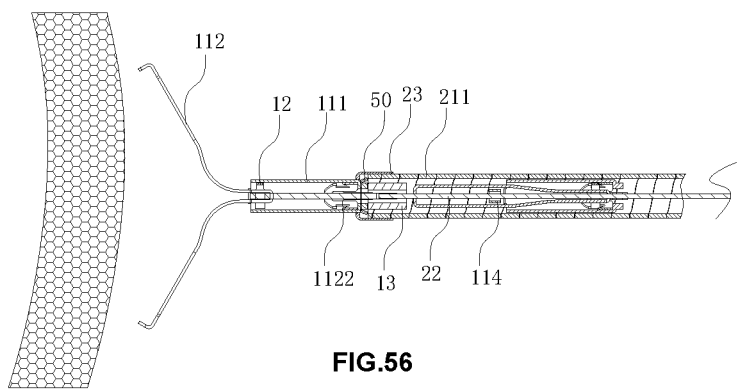
FIG. 56 is a schematic diagram of the use state of the multi-processing device for an endoscope in another embodiment.
Figure 57:
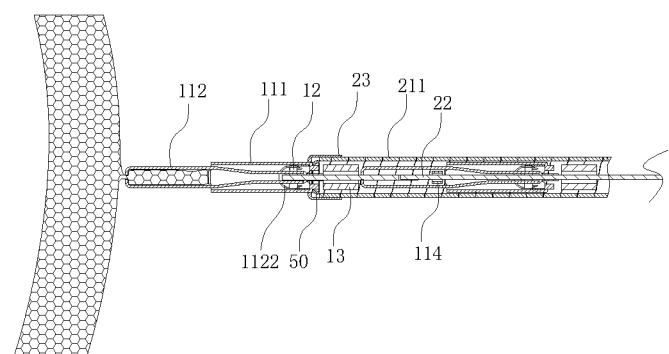
FIG. 57 is a schematic diagram of the use state of the multi-processing device for an endoscope in another embodiment.
Figure 58:
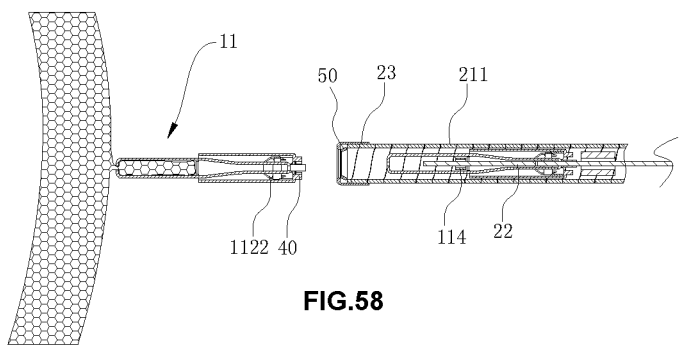
FIG. 58 is a schematic diagram of the use state of the multi-processing device for an endoscope in another embodiment.
Figure 59:
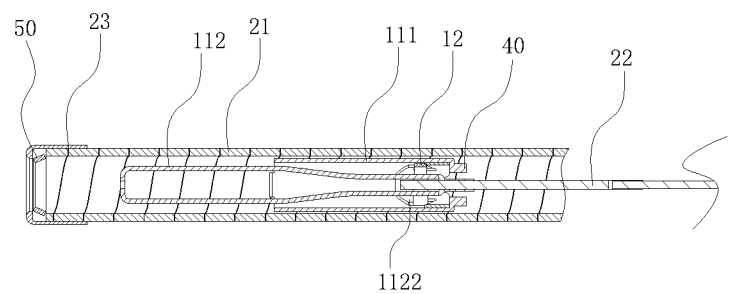
FIG. 59 is a schematic diagram of the use state of the multi-processing device for an endoscope in another embodiment.
Figure 60:
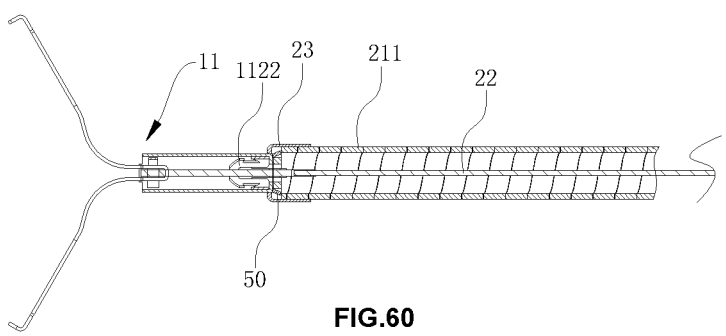
FIG. 60 is a schematic diagram of the use state of the multi-processing device for an endoscope in another embodiment.
Figure 61:
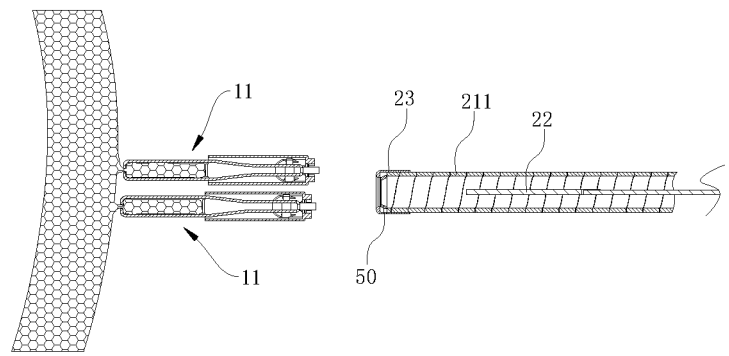
FIG. 61 is a schematic diagram of the use state of the multi-processing device for an endoscope in another embodiment.

Further, a push pipe 25 may be arranged in the conveying pipe 21, and the control member 22 may penetrate the push pipe 25. The material of the push pipe 25 may include at least one of PTFE (polytetrafluoroethylene), HDPE (high density polyethylene) and Peek (polyether ether ketone), which can reduce friction between the control member 22 and the conveying pipe 21, so that the control member 22 may advance and retreat freely in the conveying pipe 21, and a distal end of the push pipe 25 may be directly or abutted against the processing unit close to the push pipe 25 through the spacer member 13 (shown in FIG. 53). The push pipe 25 may have a small diameter and limited driving force. In order to avoid bending of the push pipe 25 during the pushing process, it may act on the processing component 10 indirectly through the spacer member 13.

By pushing the push pipe 25 toward the distal direction of the conveying pipe 21, the processing unit 11 located at the proximal end of the conveying pipe 21 may move to the distal direction, so that the control member 22 may effectively load and operate the processing units 11 located outside of the original loading stroke s2.

Referring also to FIG. 41 to FIG. 44, s1 represents a moving stroke of the sliding ring 322, and s3 represents a stroke that the control member 22 may effectively load the processing unit 11. Generally, s1=s3. s2 located at the proximal end of s3 may indicate that the control member 22 cannot effectively load the processing unit 11 located within this range by operating the sliding finger 322. Therefore, in this embodiment, the processing unit 11 located at s2 may be moved to s3 one by one by moving the push pipe 25 to the distal end of the conveying pipe 21.

Figure 45:
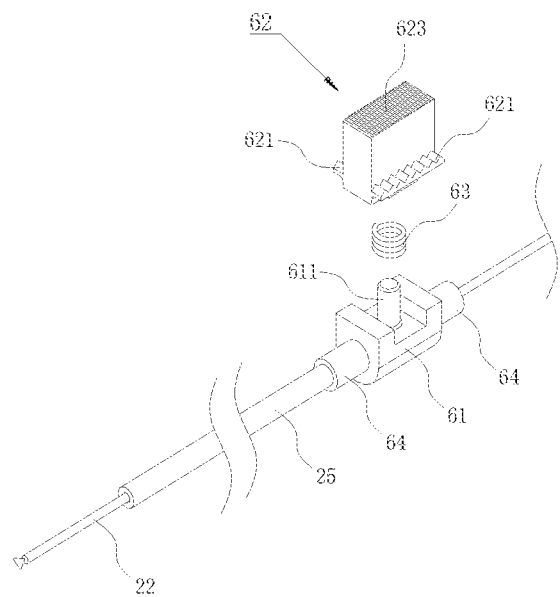
FIG. 45 is an exploded schematic diagram of a push component in one embodiment.

Referring also to FIG. 45, the push component 60 of this embodiment may include a fixed seat 61, which may be sleeved on the push pipe 25 and fixedly connected with the push pipe 25. The fixed seat 61 may drive the push pipe 25 to move relative to the conveying pipe 21 under an external force. In this way, the control member 22 may be operated by the sliding ring 322, and the push pipe 25 may be operated by the push component 60, so that the plurality of processing units 11 located in the conveying pipe 21 may be effectively loaded.

The fixed seat 61 may be sleeved on the push pipe 25. Accordingly, the fixed seat 61 may be provided with a shaft hole for the push pipe 25 to pass through (not shown in the figure), and the fixed seat 61 may be fixed to the push pipe 25 by bonding. In other embodiments, the fixed seat 61 and the push pipe 25 may also be fixed by riveting, welding, clamping, etc. Moreover, the fixed seat 61 may also be fixed on the outer wall of the push pipe 25. under a premise of not affecting a synchronous movement of the fixed seat 61 and the push pipe 25, the structure and setting position of the fixed seat 61 are not limited in the present application.

Further, the push component 60 may also include a locking member 62 and a reset member 63. The locking member 62 may be connected to the fixed seat 61. The reset member 63 may be arranged between the fixed seat 61 and the locking member 62 and abut against the locking member 62. The locking member 62 may be provided with a first locking part 621, and the handle part 31 may be provided with a second locking part 311. The first locking part 621 may be engaged or disengaged with the second locking part 311 to lock or unlock the locking member 62 and the handle part 31.

When the locking member 62 and the handle part 31 are locked, the push pipe 25 may not move. When the distal end of the control member 22 is loaded and connected with the corresponding processing unit 11, it may be necessary to operate the control member 22 from the distal end of the conveying pipe 21 to the proximal end of the conveying pipe 21. At this time, it may be necessary to ensure that the processing unit 11 cannot move to the proximal end of the conveying pipe 21, otherwise the control member 22 and the processing unit 11 may move to the proximal end of the conveying pipe 21 at the same time, so that the control member 22 may not effectively load the processing unit 11. Therefore, in this embodiment, when the push pipe 25 is in the locked state, the processing component 10 may not move towards the proximal end of the conveying pipe 21 due to the restriction of the push pipe 25, so it may ensure the effective loading of each processing unit 11 in the locked state.

In this embodiment, the reset member 63 may be arranged between the fixed seat 61 and the locking member 62, and one end of the reset member 63 may abut against the fixed seat 61 and the other end may abut against the locking member 62, so that the locking member 62 may always have a tendency to engage with the second locking part 311. It can be understood that in other embodiments, the first locking part 621 and the second locking part 311 may also be locked in other ways, such as clamping, magnetic attraction, etc. Preferably, the first locking part 621 on the locking member 62 may be arranged as a rack.

In this embodiment, the locking member 62 and the handle part 31 may be unlocked by pressing the locking member 62 towards the fixed seat 61. At this time, the locking member 62 may be moved along the axis direction of the conveying pipe 21 and drive the fixed seat 61 and the push pipe 25 to move synchronously. After the pressing pressure is cancelled, the locking member 62 may move towards the handle part 31 under the action of the reset member 63 and restore the locking with the second locking part 311.

Further, the number of the second locking parts 311 may be arranged as a plurality arranged along the moving direction of the fixed seat 61, and may be arranged as a continuous rack. In the preferred embodiment, a moving stroke of the first locking part 621 and the second locking part 311 through one unlocking, moving, and relocking may correspond to the length of one processing unit 11.

Figure 46:
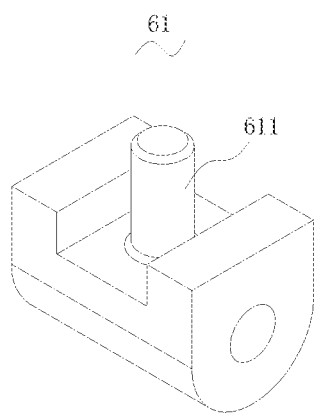
FIG. 46 is a structural diagram of a fixed seat in one embodiment.
Figures 47, 48:
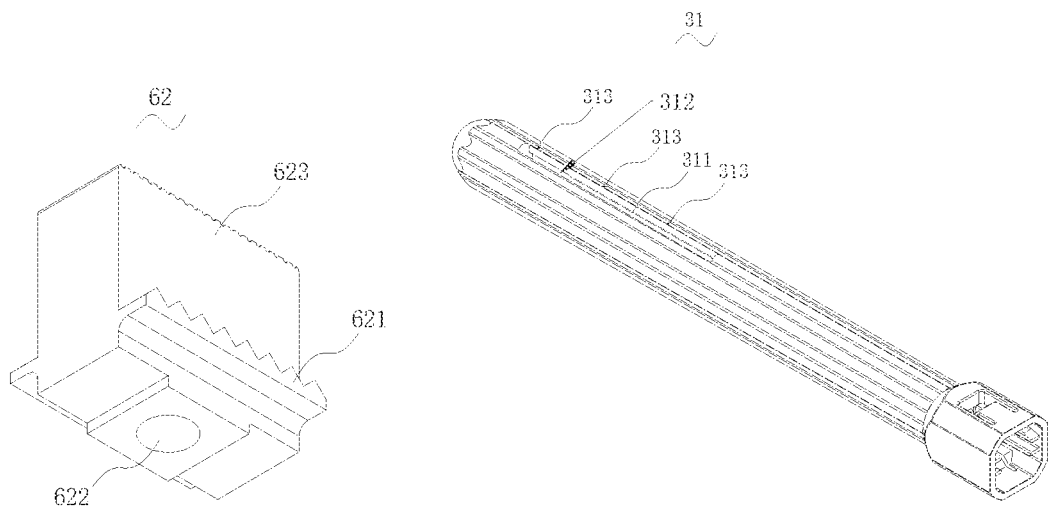
FIG. 47 is a structural diagram of a locking member in one embodiment.
FIG. 48 is a structural diagram of a handle part in one embodiment.
Figure 49:
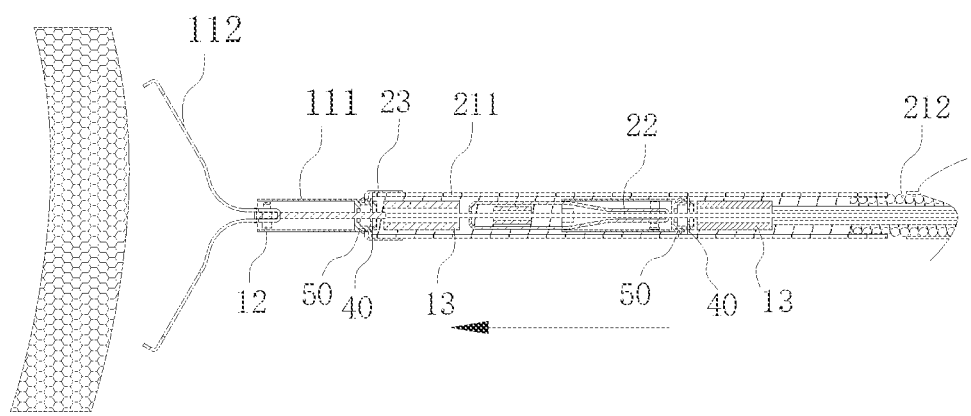
FIG. 49 is a schematic diagram of the use state of the multi-processing device for an endoscope in one embodiment.
Figure 50:
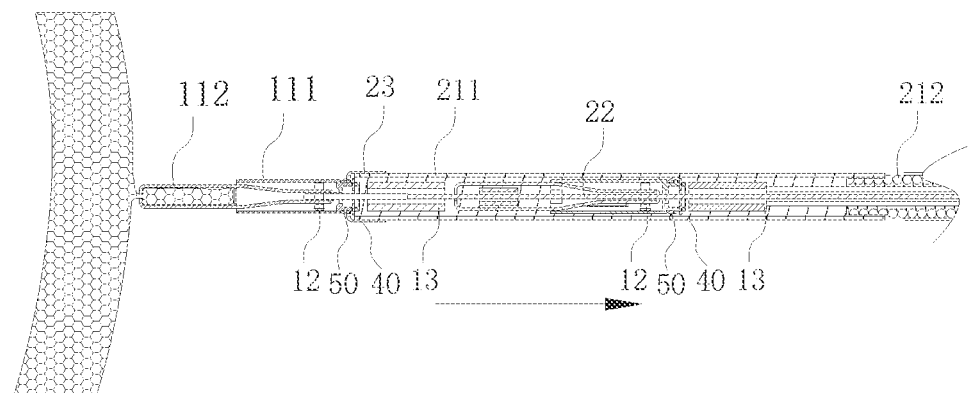
FIG. 50 is a schematic diagram of the use state of the multi-processing device for an endoscope in one embodiment.
Figure 51:
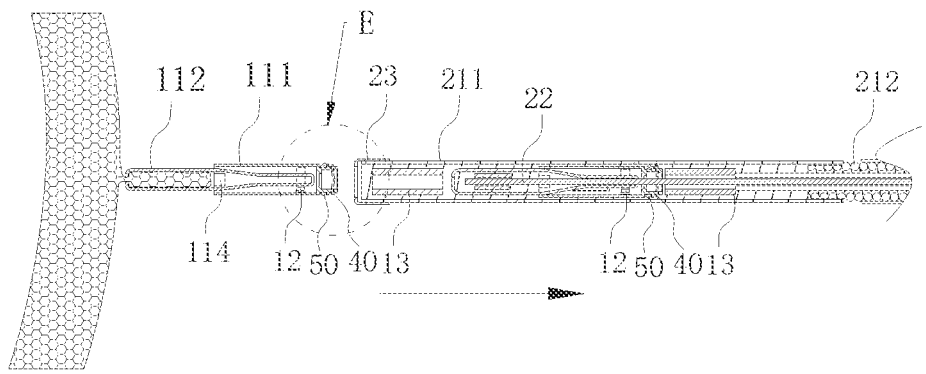
FIG. 51 is a schematic diagram of the use state of the multi-processing device for an endoscope in one embodiment.

Referring also to FIG. 46 and FIG. 47, the fixed seat 61 may be provided with a guide column 611 extending towards the locking member 62, and the locking member 62 may be provided with a guide groove 622 for the guide column 611 to extend. The locking member 62 may be configured to move along an axis direction of the guide column 611 relative to the locking member 62. In this way, the unlocking and locking operation of the locking member 62 can be more stable and reliable by guiding the movement of the locking member 62.

The locking member 62 may also be provided with an extension part 623 which may extend out of the sidewall of the handle part 31 under the locking configuration, and the sidewall of the handle part 31 may be correspondingly provided with the chute 312 which may match and move with the extension part 623. Preferably, knurling (not shown) may be arranged on the surface of the extension part 623 to increase a friction of the extension part 623 and facilitate its moving operation.

Preferably, the second locking part 311 may be arranged on the inner wall of the handle part 31, and the first locking part 621 may be located on the surface of the locking member 62 facing the second locking part 311. It can be understood that the second locking part 311 may also be arranged on the sidewall of the chute 312, and the first locking part 621 may be relatively located on the surface of the locking member 62 facing the second locking part 311.

Referring also to FIG. 48, for ease of use, the handle part 31 may be provided with marking parts 313, and a number of the marking parts 313 may exceed one, the marking parts may be configured to indicate a number of remaining processing units 11 in the conveying pipe 21. An arrangement and number of the marking parts 313 may be adjusted according to the number of processing units 11 accommodated in the conveying pipe 21. Preferably, the number of marking parts 313 may be set to a plurality of arranged along a moving direction of the fixed seat 61 at a same interval. Further, the marking parts 313 may select a digital marker. It can be understood that the marking parts 313 may also adopt other marking methods such as pattern marking.

Further, in order to make the synchronous movement between the fixed seat 61 and the push pipe 25 more stable and reliable, the push component 60 may also include a crimping piece 64, the crimping piece 64 may be sleeved on the push pipe 25 and fixedly connected with the fixed seat 61. Preferably, a number of crimping pieces 64 may be set to two, and the two crimping pieces 64 may be respectively fixed at both ends of the fixed seat 61.

Referring also to FIG. 49 to FIG. 61, FIG. 49 to FIG. 55 are schematic diagrams of the multi-processing device for an endoscope in one embodiment under different use states, FIG. 56 to FIG. 61 are schematic diagrams of the use state of the multi-processing device for an endoscope in another embodiment.

In one embodiment, the use method of the multi-processing device for an endoscope may comprise the following operations. In first operation, after a processing unit at a distal end of the conveying pipe is released, the control member may be driven to the proximal end of the conveying pipe until the control member cannot be further driven towards the proximal end of the conveying pipe under a certain driving force, and a first user feedback indicating a connection of a next processing unit and a distal end of the control member is obtained. The first user feedback may include a sound of the connection of the control member and the processing unit and an operation that cannot be pulled further. At this time, the control member may drive the processing unit to move synchronously.

In second operation, the control member may be driven to the distal end of the conveying pipe until the control member cannot be further driven towards the distal end of the conveying pipe under a certain driving force, and a second user feedback indicating a clamping of the first limit part and the second limit part is obtained. The second user feedback may include a sound of the clamping of the first limit part and the second limit part and an operation that cannot be pulled further. The control member may drive the processing unit to move back and forth and rotate relative to the capsule body, so as to repeat the opening, closing, and rotation operations of the processing unit until the processing unit completes the clamping operation.

Figure 52:
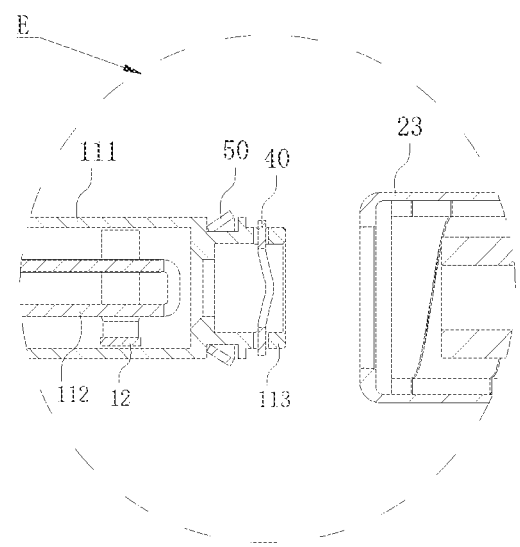
FIG. 52 is an enlarged schematic diagram of part E in FIG. 51.

In third operation, after the tissue is clamped, the control member may be driven towards the proximal end of the conveying pipe, the first limit part may deform (as shown in FIG. 52) or fail, and release the processing unit.

In one embodiment, the use method of the multi-processing device for an endoscope may comprise the following operations. In first operation, the sliding part may be moved to the distal end of the conveying pipe, so that the plurality of processing units located in a moving stroke of the sliding part may be driven by the control member and released one by one.

In second operation, the push component may be pressed and moved to the distal end of the conveying pipe, so that a plurality of processing units outside the moving stroke of the sliding part may be driven by the push pipe and released one by one.

In one embodiment, the use method of the multi-processing device for an endoscope may be based on a processing device for an endoscope. The multi-processing device for an endoscope may include a processing component, a conveying component and a push component. The processing component may include more than two processing units. The push component may include a conveying pipe for accommodating the processing component and a push pipe passing through the conveying pipe, and a control member passing through the push pipe, wherein the distal end of the push pipe may abut against a processing unit close to the push pipe, and the push component may be fixedly connected to the proximal end of the push pipe.

The use method may comprise the following operations. In first operation, after a processing unit at a most distal end of the conveying pipe is released, the control member may be driven to a proximal side relative to the conveying pipe until a first user feedback indicating a combination of a next processing unit and a distal end of the control member is obtained;

In second operation, the push component may be driven to a distal side relative to the conveying pipe, and the next processing unit may be moved to a distal end of the conveying pipe through the push pipe fixed to the push component until a second user feedback indicating a connection of the next processing unit and the distal end of the conveying pipe is obtained;

In third operation, after the second user feedback is obtained, an operation component may be driven to cause a most distal processing unit to open and close freely to obtain a desired action posture.

Further, the push component may include a fixed seat, a locking member, and a reset member, the reset member may be arranged between the fixed seat and the locking member and abut against the locking member, the locking member may be provided with a first locking part matched with a second locking part on a handle part. The above second operation may also include driving the push component to the distal side relative to the conveying pipe, when the push pipe moves, pressing the locking member to unlock the first locking part and the second locking part; after the second user feedback is received, releasing the locking member to restore a locking of the first locking part and the second locking part.

At this time, the use method of the multi-processing device for an endoscope may comprise the following steps. In first operation, after a processing unit at a most distal end of the conveying pipe is released, the control member may be driven to a proximal side relative to the conveying pipe until a first user feedback indicating a combination of a next processing unit and a distal end of the control member is obtained.

In second operation, the push component may be driven to a distal side relative to the conveying pipe, when the push pipe moves, the locking member may be pressed to unlock the first locking part and the second locking part; after the second user feedback is received, the locking member may be released to restore the locking of the first locking part and the second locking part.

In third operation, after the second user feedback is obtained, an operation component may be driven to cause a most distal processing unit to open and close freely to obtain a desired action posture.

By analogy, the processing units stored in the conveying pipe may be released one by one. A user can release multiple processing units to clamp the lesion by inserting the multi-processing device for an endoscope once, which can greatly reduce the operation time, compete for the rescue time for patients and medical staff, greatly reduce the labor intensity and reduce the discomfort in a process of endoscopic detection.

The technical features of the above embodiments can be combined arbitrarily. In order to make the description concise, all possible combinations of the technical features in the above embodiments are not described. However, as long as there is no contradiction in the combination of these technical features, they should be considered to be the scope recorded in this specification.

The above embodiments only express several embodiments of the application, and the description is more specific and detailed, but it cannot be understood as limiting the scope of the patent application. It should be noted that for those skilled in the art, several modifications and improvements can be made without departing from the concept of the application, which belong to the protection scope of the application.

What is claimed is:

1. A multi-processing device for an endoscope, comprising:
a plurality of processing units, the plurality of processing units including a most distal processing unit and at least one non-distal processing unit, each processing unit including a capsule body and clamping arms, the clamping arms being accommodated in the capsule body and moving to form an open configuration and a closed configuration, a proximal end of the capsule body being provided with a first limit part that is available for deformation or failure under an external force;

a conveying component including a conveying pipe for accommodating the plurality of processing units and a control member passing through the conveying pipe, a distal end of the conveying pipe being provided with a baffle extending towards an axial center of the conveying pipe, the control member being configured to drive a most distal processing unit in the plurality of processing units to switch from a combination configuration to a release configuration, wherein in the combination configuration, the most distal processing unit among the processing units is connected with the distal end of the conveying pipe, and in the release configuration, the most distal processing unit is separated from the distal end of the conveying pipe; and an operation component including a handle part connected with a proximal end of the conveying pipe and a sliding part sleeved on the handle part, the sliding part being connected with a proximal end of the control member, and the sliding part configured to drive movement of the control member;

the operation component being configured to drive the at least one non-distal processing unit to move along a direction from the proximal end of the conveying pipe to the distal end of the conveying pipe, so that the most distal processing unit in the at least one non-distal processing unit arrives at the distal end of the conveying pipe;

wherein at least one of the distal end of the conveying pipe or the proximal end of the capsule body is provided with a second limit part, the second limit part is configured to abut against the baffle, and expand and contract along a radial direction of the conveying pipe.

2. The multi-processing device for an endoscope of claim 1, wherein
the second limit part is disposed on the distal end of the conveying pipe, and in the combination configuration, the second limit part is located at a proximal end of the baffle; and
the first limit part has a concave part recessed toward an axial center of the capsule body, and the concave part is configured to abut against the second limit part and limit the capsule body.

3. The multi-processing device for an endoscope of claim 2, wherein
in the release configuration, an outer diameter of the first limit part is smaller than the smaller of a diameter of a first through hole formed by the baffle and an inner diameter of the second limit part; and/or
the first limit part has an extension part for accommodating the second limit part and an elastic part sleeved on the concave part, an inner surface of the elastic part abuts against an outer surface of the concave part, and the elastic part is configured to collapse the concave part.

4. The multi-processing device for an endoscope of claim 2, wherein
an inner diameter of the second limit part decreases from the proximal end of the conveying pipe to the distal end of the conveying pipe; and/or
the second limit part is arranged at the distal end of the conveying pipe and is accommodated in the proximal end of the baffle, in a state of no radial force acting on the second limit part, an inner diameter of a distal end of the second limit part is smaller than an outer diameter of the plurality of processing units, and an inner diameter of a proximal end of the second limit part is larger than the outer diameter of the plurality of processing units.

5. The multi-processing device for an endoscope of claim 2, wherein
in the combination configuration, a distal end of the second limit part abuts against the concave part, the proximal end of the baffle abuts against a surface of a distal end of the first limit part, and the control member is configured to move the clamping arms to form the open configuration and the closed configuration;
in the release configuration, a proximal end of the sliding part moves to release a combination relationship between the control member and the most distal processing unit and a combination relationship between the control member and the first limit part to disable a combination of the first limit part and the baffle; and/or
the second limit part is arranged at the distal end of the conveying pipe, and the second limit part includes a plurality of tooth parts arranged at intervals along a circumferential direction of the conveying pipe, the plurality of tooth parts converging toward the distal end of the conveying pipe, surfaces of distal ends of the tooth parts are configured to abut against the concave part, and proximal ends of the tooth parts are configured to abut against expanded first limit part.

6. The multi-processing device for an endoscope of claim 1, wherein the first limit part includes a first base part and a first convex part, the first base part is accommodated in the proximal end of the capsule body, the first convex part is connected to the first base part and extends outward, and the first convex part extends out of a sidewall of the capsule body and is limited to a proximal side of the baffle.

7. The multi-processing device for an endoscope of claim 6, wherein an included angle between surfaces of the first base part and the first convex part is smaller than or equal to 30°, a surface of a proximal end of the first base part is provided with a variable part, and the variable part penetrates the surface of the proximal end of the first base part and is configured to cause the first base part to deform or fail when the first base part is stressed; and/or
a distal end of the control member is protruded with a head part, a second through hole is provided at a center of the first base part, the head part passing through the first base part through the second through hole, and a minimum inner diameter of the second through hole is smaller than a maximum outer diameter of the head part; and/or
the plurality of processing units includes a base fixed at the proximal end of the capsule body, the base is provided with an accommodation cavity for accommodating the first base part, and a sidewall of the base is provided with a third through hole for the first convex part to extend.

8. The multi-processing device for an endoscope of claim 1, wherein in the combination configuration, the first limit part is located in the baffle and connected with the baffle through clamping, in the release configuration, the first limit part deforms or fails under the control member and releases the clamping with the baffle, a diameter of the first through hole formed by the baffle is greater than an outer diameter of a distal end of the first limit part and smaller than an outer diameter of a proximal end of the second limit part.

9. The multi-processing device for an endoscope of claim 1, wherein the second limit part includes a second base part and one or more second convex parts, the second base part is accommodated in the capsule body, each of the one or more second convex parts is connected with the second base part and extends outward, and the one or more second convex parts extend out of a sidewall of the capsule body and limit the baffle.

10. The multi-processing device for an endoscope of claim 9, wherein,
a number of the one or more second convex parts exceeds 1, and the one or more second convex parts are arranged at intervals along a circumferential direction of the second base part; and/or
a first opening providing deformation allowance is arranged on a sidewall of the second limit part, and the first opening penetrates the sidewall of the second limit part; and/or
the sidewall of the second limit part is provided with one or more second openings, the one or more second openings extend from a surface of the proximal end of the sidewall of the second limit part to the sidewall of the second limit part, a number of the one or more second openings exceeds 1, and the one or more second openings are arranged at intervals along the circumferential direction of the second limit part.

11. The multi-processing device for an endoscope of claim 1, wherein
a distal end of the control member is configured as a head part, a concave part and a shoulder part; and/or
a proximal end of the clamping arms is provided with a fastener for the concave part to pass through and be fixed, the fastener abuts against the proximal end of the head part and the distal end of the shoulder part, and the fastener disables when subjected to a predetermined force.

12. The multi-processing device for an endoscope of claim 11, wherein,
the distal end of the shoulder part is inclined toward a central axis to ensure that the control member is clamped at a proximal end of the fastener, to drive the most distal processing unit to rotate; and/or
the plurality of processing units includes a spacer member arranged between two clamping arms, and under the closed configuration, the control member passes through the spacer member in a direction of the head part abutting against the fastener to a proximal side under restriction of the spacer member.

13. The multi-processing device for an endoscope of claim 11, wherein
the fastener includes a pair of pin sheets passing through the proximal end of the clamping arm, each of the pair of pin sheets includes a first end and a second end, the second end is a movable end, the first end is integrally formed into a U shape or the first end is provided with a block strip configured to limit the pin sheet and fix the first end on the clamping arm; and/or
the fastener further includes folding parts formed by surfaces of the clamping arms transiting inward, and the folding parts and the clamping arms are surrounded and forms two end faces for clamping against the concave part.

14. The multi-processing device for an endoscope of claim 1, wherein
a portion of a sidewall at the proximal end of each of the clamping arms extends outward and forms a locking part, a portion of a sidewall of the capsule body bends inward and forms a clamping hole part on the sidewall of the capsule body, the clamping hole part is fitted with the locking part and is configured to restrict the clamping arms from moving towards the distal end of the capsule body; and/or
the baffle is provided with a through hole for the capsule body and the second limit part to pass through, an outer diameter of a proximal end of the second limit part is greater than a diameter of the through hole of the baffle, and the second limit part is configured to pass through the through hole of the baffle by interference; and/or
the plurality of processing units are arranged successively along a length of the conveying pipe, and the plurality of processing units are available to leave an inner cavity of the conveying pipe one by one and release from the distal end of the conveying pipe one by one; and/or
the conveying pipe includes a first pipe substantially located at the distal end of the conveying pipe and a second pipe substantially located at the proximal end of the first pipe, the first pipe is fixed at the second pipe, the first pipe is wound by flat wires, the second pipe is wound by round wires, and the first pipe is configured to accommodate the plurality of processing units; and/or
in the combination configuration, the control member penetrates the at least one non-distal processing unit and penetrates a distal end of the first limit part of the most distal processing unit;
the control member is configured to move in a direction of the distal end of the conveying pipe to the proximal end of the conveying pipe to switch the most distal processing unit to the release configuration, and is connected with a non-distal processing unit adjacent to the most distal processing unit; and
the operation component is configured to drive the at least one non-distal processing unit to move along a direction from the proximal end of the conveying pipe to the distal end of the conveying pipe, so that a most distal processing unit in the at least one non-distal processing unit arrive at the distal end of the conveying pipe.

15. A multi-processing device for an endoscope, comprising:
a processing component, including a plurality of processing units, the plurality of processing units including a most distal processing unit and at least one non-distal processing unit, a proximal end of each processing unit being provided with a first limit part that is available for deformation or failure under an external force;
a conveying component including a conveying pipe for accommodating the processing component, a push pipe passing through the conveying pipe, and a control member passing through the push pipe, wherein a distal end of the push pipe abuts against a processing unit close to the push pipe;
an operation component, wherein the operation component includes:
a handle part connected with a proximal end of the conveying pipe;
a sliding part connected with a proximal end of the control member to control opening, closing, and release of a most distal processing unit; and
a push component arranged on the handle part, the push component including a fixed seat fixed at a proximal end of the push pipe;
the operation component being configured to drive the at least one non-distal processing unit to move along a direction from the proximal end of the conveying pipe to the distal end of the conveying pipe, so that the most distal processing unit in the at least one non-distal processing unit arrives at the distal end of the conveying pipe;

wherein the handle part is provided with a chute for sliding of the fixed seat, and the handle part is provided with a marker matching with the fixed seat and indicating a number of the plurality of processing units along the chute.

16. The multi-processing device for an endoscope of claim 15, wherein
the push component also includes a locking member and a reset member, the locking member is connected to the fixed seat, the reset member is arranged between the fixed seat and the locking member and abuts against the locking member, the locking member is provided with a first locking part, the handle part is provided with a second locking part, and the first locking part is configured to engage or disengage with the second locking part to lock or unlock the locking member and the handle part; and/or
the fixed seat is provided with a guide column extending towards the locking member, the locking member is provided with a guide groove for the guide column to extend, and the locking member is configured to move along an axis direction of the guide column relative to the locking member; and/or
the locking part is also provided with an extension part which extends out of a sidewall of the handle part under a locking configuration, and the sidewall of the handle part is correspondingly provided with the chute for the extension part to extend and slide.

17. The multi-processing device for an endoscope of claim 15, wherein
the handle part is provided with marking parts, and a number of the marking parts exceeds 1, the marking parts are arranged along a moving direction of the fixed seat at the same interval;
the marking parts are digital markers, the digital markers are configured to indicate a number of remaining processing units.

18. The multi-processing device for an endoscope of claim 15, wherein
the push component also includes crimping parts, the crimping parts are sleeved on the push pipe and fixedly connected with the fixed seat, a number of the crimping parts is set to two, and the two crimping parts are respectively fixed at both ends of the fixed seat.

19. A use method of a multi-processing device for an endoscope, wherein:
the use method is based on a multi-processing device for an endoscope, the multi-processing device for an endoscope includes a processing component, a conveying component and a push component, the processing component includes a plurality of processing units, and the push component includes a conveying pipe for accommodating the processing component, a push pipe passing through the conveying pipe, and a control member passing through the push pipe, wherein a distal end of the push pipe abuts against a processing unit close to the push pipe; the push component is fixedly connected to a proximal end of the push pipe;
the plurality of processing units include a most distal processing unit and at least one non-distal processing unit, each processing unit including a capsule body, a proximal end of the capsule body is provided with a first limit part that is available for deformation or failure under an external force;
a distal end of the conveying pipe being provided with a baffle extending towards an axial center of the conveying pipe, the control member is configured to drive a most distal processing unit in the plurality of processing units to switch from a combination configuration to a release configuration, wherein in the combination configuration, the most distal processing unit among the processing units is connected with the distal end of the conveying pipe, and in the release configuration, the most distal processing unit is separated from the distal end of the conveying pipe;
wherein at least one of the distal end of the conveying pipe or the proximal end of the capsule body is provided with a second limit part, the second limit part is configured to abut against the baffle, and expand and contract along a radial direction of the conveying pipe;
the use method comprises:
after a processing unit at a most distal end of the conveying pipe is released, driving the control member to a proximal side relative to the conveying pipe until a first user feedback indicating a connection of a next processing unit and a distal end of the control member is obtained;
driving the push component to a distal side relative to the conveying pipe, and moving the next processing unit to the distal end of the conveying pipe through the push pipe fixed to the push component until a second user feedback indicating a connection of the next processing unit and the distal end of the conveying pipe is obtained;
after the second user feedback is obtained, driving an operation component to cause the most distal processing unit to open and close freely to obtain a desired action posture,
the operation component being configured to drive the at least one non-distal processing unit to move along a direction from the proximal end of the conveying pipe to the distal end of the conveying pipe, so that the most distal processing unit in the at least one non-distal processing unit arrives at the distal end of the conveying pipe.

20. The use method of claim 19, wherein the push component includes a fixed seat, a locking member, and a reset member, the reset member is arranged between the fixed seat and the locking member and abuts against the locking member, the locking member is provided with a first locking part matched with a second locking part on a handle part;
the driving the push component to a distal side relative to the conveying pipe, and moving the next processing unit to the distal end of the conveying pipe through the push pipe fixed to the push component until the second user feedback indicating a connection of the next processing unit and the distal end of the conveying pipe is obtained, further includes:
driving the push component to the distal side relative to the conveying pipe, when the push pipe moves, pressing the locking member to unlock the first locking part and the second locking part;
after the second user feedback is received, releasing the locking member to restore a locking of the first locking part and the second locking part.

* * * * *